US009206296B2

(12) United States Patent
Shinohara et al.

(10) Patent No.: US 9,206,296 B2
(45) Date of Patent: Dec. 8, 2015

(54) POLYLACTIC RESIN EXPANDED BEADS AND MOLDED ARTICLE OF THE EXPANDED BEADS

(75) Inventors: Mitsuru Shinohara, Yokkaichi (JP); Masaharu Oikawa, Yokkaichi (JP)

(73) Assignee: JSP CORPORATION, Tokyo (JP)

( * ) Notice: Subject to any disclaimer, the term of this patent is extended or adjusted under 35 U.S.C. 154(b) by 374 days.

(21) Appl. No.: 13/696,856

(22) PCT Filed: Mar. 24, 2011

(86) PCT No.: PCT/JP2011/057104
§ 371 (c)(1),
(2), (4) Date: Nov. 8, 2012

(87) PCT Pub. No.: WO2011/145391
PCT Pub. Date: Nov. 24, 2011

(65) Prior Publication Data
US 2013/0059154 A1 Mar. 7, 2013

(30) Foreign Application Priority Data

May 18, 2010 (JP) .................................. 2010-113951
Jul. 22, 2010 (JP) .................................. 2010-164749

(51) Int. Cl.
C08G 63/08 (2006.01)
C08L 67/04 (2006.01)
(Continued)

(52) U.S. Cl.
CPC .. *C08J 9/122* (2013.01); *C08J 9/16* (2013.01); *C08J 9/18* (2013.01); *C08J 9/232* (2013.01); *C08J 2205/052* (2013.01); *C08J 2367/02* (2013.01); *Y10T 428/2989* (2015.01)

(58) Field of Classification Search
CPC .......... C08G 63/08; C08L 67/04; B32B 27/14
See application file for complete search history.

(56) References Cited

U.S. PATENT DOCUMENTS 2,758,987 A 8/1956 Saizberg
4,057,537 A 11/1977 Sinclair
(Continued)

FOREIGN PATENT DOCUMENTS

EP 0 712 880 A2 5/1996
EP 1378538 A1 1/2004
(Continued)

OTHER PUBLICATIONS

JPO machine translation of JP-2009-062502, Mar. 26, 2009.*
(Continued)

*Primary Examiner* — Randy Gulakowski
*Assistant Examiner* — Jeffrey Washville
(74) *Attorney, Agent, or Firm* — Bacon & Thomas, PLLC

(57) ABSTRACT

An expanded bead of a polylactic acid resin, having an exterior surface, a surface region including the entire exterior surface and having a weight of one-sixth to one-fourth the weight of the expanded bead, and a center region located inside the surface region and having a weight of one-fifth to one-third the weight of the expanded bead, wherein the expanded bead, the surface region and the center region, after having been subjected to a pretreatment including a heat treatment at 110° C. for 120 minutes followed by cooling at a cooling speed of 2° C./min, have endothermic calorific values of (Br:endo), (Brs:endo) and (Brc:endo), respectively, when measured by heat flux differential scanning calorimetry at a heating speed of 2° C./min in accordance with JIS K7122 (1987), and wherein (Br:endo) is greater than 25 J/g and (Brs:endo) is smaller than (Brc:endo) and is not smaller than 0 J/g.

7 Claims, 6 Drawing Sheets

(51) Int. Cl.
  *B32B 27/14* (2006.01)
  *C08J 9/12* (2006.01)
  *C08J 9/18* (2006.01)
  *C08J 9/232* (2006.01)
  *C08J 9/16* (2006.01)

(56) References Cited

U.S. PATENT DOCUMENTS

| | | | |
|---|---|---|---|
| 5,310,865 A | 5/1994 | Enomoto et al. | |
| 5,428,126 A | 6/1995 | Kashima et al. | |
| 5,637,631 A | 6/1997 | Kitada et al. | |
| 7,863,343 B2 | 1/2011 | Haraguchi et al. | |
| 8,129,438 B2 | 3/2012 | Nohara et al. | |
| 2010/0136338 A1 | 6/2010 | Hirai et al. | |

FOREIGN PATENT DOCUMENTS

| | | |
|---|---|---|
| EP | 1683828 A2 | 7/2006 |
| JP | S4116125 | 9/1966 |
| JP | S43-23858 | 10/1968 |
| JP | S44-29522 | 12/1969 |
| JP | 46-38359 | 11/1971 |
| JP | S51-22951 | 7/1976 |
| JP | 60-185816 A | 9/1985 |
| JP | 62-128709 B2 | 6/1987 |
| JP | 62-151325 B2 | 7/1987 |
| JP | 62-151326 B2 | 7/1987 |
| JP | 09-104026 A | 4/1997 |
| JP | 09-104027 A | 4/1997 |
| JP | 10-180888 A | 7/1998 |
| JP | 2000-136261 A | 5/2000 |
| JP | 2004-83890 A | 3/2004 |
| JP | 2006-233192 A | 9/2006 |
| JP | 2006-282750 A | 10/2006 |
| JP | 2006-282753 A | 10/2006 |
| JP | 2007-100025 A | 4/2007 |
| JP | 2009-062502 A | 3/2009 |
| JP | 2009-173021 A | 8/2009 |
| WO | 2008/123367 A1 | 10/2008 |

OTHER PUBLICATIONS

International Search Report in corresponding International Application No. PCT/JP2011/057104, dated May 24, 2011.
Supplementary European Search Report dated Jun. 12, 2014, for EP 11783328.

\* cited by examiner

POLYLACTIC RESIN EXPANDED BEADS AND MOLDED ARTICLE OF THE EXPANDED BEADS

TECHNICAL FIELD

The present invention relates to polylactic resin expanded beads suited for being molded in a mold and to an in-mold molded article of the expanded beads.

BACKGROUND ART

In recent years, with an increase of sensitivity to global environment, a polylactic resin receives attention as a carbon neutral material that is a substitute for general resins produced from the conventional petroleum resources. A polylactic resin is produced from a plant such as corn as a starting material and is a thermoplastic resin that is regarded as being of a low environmental load type from the standpoint of carbon neutral. Such a polylactic resin is expected to be used as an environmentally gentle, plant-derived general resin for foams. Thus studies are being made on foams made of a polylactic resin as a raw material. Among such foams, polylactic resin expanded beads-molded articles can be obtained by in-mold molding in any desired shape without restriction, similar to conventional polystyrene resin expanded beads-molded articles and polyolefin resin expanded beads-molded articles. Such molded articles are, thus, promising in that they are likely to allow easy design of properties according to the aimed lightness in weight, cushioning property and heat insulating property. Inventions disclosed in Patent Documents 1 to 7 have been proposed.

PRIOR ART DOCUMENTS

Patent Document

Patent Document 1: Japanese Kokai Publication No. JP-A-2000-136261
Patent Document 2: Japanese Kokai Publication No. JP-A-2004-83890
Patent Document 3: Japanese Kokai Publication No. JP-A-2006-282750
Patent Document 4: Japanese Kokai Publication No. JP-A-2006-282753
Patent Document 5: Japanese Kokai Publication No. JP-A-2009-62502
Patent Document 6: Japanese Kokai Publication No. JP-A-2007-100025
Patent Document 7: International Publication No. WO2008/123367

SUMMARY OF THE INVENTION

Problems to be Solved by the Invention

Patent Document 1 discloses expandable resin particles of an aliphatic polyester such as polylactic acid, in which a volatile blowing agent such as n-pentane has been impregnated in a temperature range in which the degree of crystallization is 0 to 20%. An expanded beads-molded article of Patent Document 1 obtained from a polylactic resin is prepared by placing the expandable resin particles in a mold and heating them with hot wind to expand and, at the same time, fuse-bond the beads together and, therefore, has problems that the density significantly varies with position thereof, fuse-bonding between expanded particles and the dimensional stability are not sufficient, and mechanical properties are not satisfactory.

Patent Document 2 discloses expanded beads of a polylactic resin which contains at least 50% by mole of lactic acid units, wherein the expanded beads show such characteristics in heat flux scanning differential calorimetry that a difference between the endothermic calorific value and the exothermic calorific value is 0 J/g or more and less than 30 J/g and an endothermic calorific value is 15 J/g or more (indicating that the crystallization has not sufficiently proceeded). Though the polylactic resin expanded beads disclosed in Patent Document 2 show an improvement in fuse-bonding property between beads and in secondary expandability, there is a room for further improvement in fuse-bonding property in view of the fact that the fuse-bonding between beads is not sufficient when the molded article has a complicated shape and the fuse-bonding between beads in a center region of the molded article is not sufficient when the molded article has a large thickness.

Patent Documents 3 and 4 disclose polylactic resin expanded beads which contain a specific fuse-bonding improving agent and which permit in-mold molding by heating at a lower temperature than that required for expanded beads containing no such an improving agent. Similar to the expanded beads disclosed in Patent Document 2, the expanded beads described in Patent Documents 3 and 4 still have a room for improvement in fuse-bonding between the expanded beads when a molded article having a complicated shape or a large thickness is intended to be produced.

Patent Document 5 discloses polylactic resin expanded beads wherein an endothermic calorific value (Rendo) thereof after a heat treatment is within a specific range, an endothermic calorific value (Bendo:J/g) and an exothermic calorific value (Bexo:J/g) thereof before the heat treatment have a specific relationship, and an exothermic calorific value (Bs:J/g) of a surface region thereof before the heat treatment and an exothermic calorific value (Bc:J/g) of a center region thereof have a specific relationship. In the expanded beads, the crystallization has not fully proceeded as a whole and, further, the degree of crystallization in the surface region thereof is lower than that in the center region. Therefore, the expanded beads show excellent inter-bead fuse-bonding property and permit production of molded articles having a large thickness or a complicated shape. The above expanded beads, however, require a control of the degree of crystallization thereof in order to obtain improved inter-bead fuse-bonding and have a problem in the production efficiency because of the necessity of precise temperature control. For example, whilst it is relatively easy to obtain resin particles having a very low degree of crystallization by rapidly cooling the resin particles at the time the resin particles are formed, expanded beads obtained from the resin particles have poor reproducibility in their expansion ratio and thermal characteristics so that an expanded beads-molded article showing good fuse-bonding between the beads is not obtained in a stable manner, unless the temperature and time are severely controlled during a step of impregnating the resin particles with a blowing agent and a step of heating and expanding the resin particles impregnated with blowing agent. Therefore, a further improvement in the production efficiency of expanded beads-molded articles is demanded.

Patent Document 6 discloses expanded beads obtained by cutting a foam body produced by extrusion. The expanded beads, when molded in a mold, can give a polylactic resin foam molding having excellent heat resistance and mechanical strength. However, since it is necessary to use a relatively highly crystalline polylactic resin in order to obtain an improvement in heat resistance. Therefore, the proposed technique has a problem that an expanded beads-molded article having satisfactory fuse-bonding is not obtained in a stable state because the crystallization degree of the polylactic resin from which the expanded beads are formed tends to be high.

Patent Document 7 discloses a method for producing polylactic resin expanded beads, in which a polylactic resin containing a blowing agent is extruded from an extruder through a nozzle die. The foamed extrudate is cut with a rotary blade to form polylactic resin expanded beads. The expanded beads are scattered and cooled upon collision against a cooling member disposed in front of the nozzle mold. In this method, it is essential to rapidly cool the expanded beads immediately after the extrusion foaming in order that the obtained expanded beads have good in-mold moldability. Due to the rapid cooling process, however, the method has a problem that it is difficult to obtain expanded beads having a high expansion ratio.

It is, therefore, an objective problem of the present invention to provide polylactic resin expanded beads that are suited to be molded in a mold and that permit stable production of a polylactic resin expanded beads-molded article having excellent fuse-bonding between the expanded beads without being restricted by the desired shape of the expanded beads-molded article.

Means for Solving the Problems

The present invention provides the following polylactic resin expanded beads:

[1] A polylactic resin expanded bead formed of a polylactic resin as a base resin, characterized in that an endothermic calorific value (Br:endo) [J/g] of the whole expanded bead, an endothermic calorific value (Brs:endo) [J/g] of a surface region of the expanded bead and an endothermic calorific value (Brc:endo) [J/g] of a center region of the expanded bead, as determined under Condition 1 shown below in accordance with heat flux differential scanning calorimetry stipulated in JIS K7122 (1987), meet the following formulas (1) and (2):

$$(Br:endo) > 25 \quad (1)$$

$$(Brc:endo) > (Brs:endo) \geq 0 \quad (2),$$

Condition 1
[Preparation of Measurement Specimens]
<Specimen for Measuring the Endothermic Calorific Value of the Surface Region of the Expanded Bead>
a surface portion of the expanded bead, including an exterior surface thereof, is cut out and collected to obtain a measurement specimen, such that the entire exterior surface thereof is removed and the measurement specimen has a weight of 1/6 to 1/4 the weight of the expanded bead before being cut;
<Specimen for Measuring the Endothermic Calorific Value of the Center Region of the Expanded Bead>
an entire surface portion of the expanded bead is cut away to leave a measurement specimen, such that the measurement specimen has a weight of 1/5 to 1/3 the weight of the expanded bead before being cut;
[Measurement of Endothermic Calorific Values]
the calorific values (Br:endo), (Brc:endo) and (Brs:endo) are values determined from DSC curves obtained by first subjecting each of the expanded bead, the measurement specimen obtained from the surface region of the expanded bead and the measurement specimen obtained from the center region of the expanded bead to a heat treatment in such a manner that 1 to 4 mg of each of them is heated, for melting, to a temperature higher by 30° C. than a melt completion temperature thereof, then maintained at that temperature for 10 minutes, then cooled to 110° C. at a cooling speed of 2° C./min and then maintained at that temperature for 120 min, and then cooling the resulting sample to 40° C. at a cooling speed of 2° C./min, each of the thus heat treated specimens being subsequently heated again, for melting, to a temperature higher by 30° C. than the melt completion temperature at a heating speed of 2° C./min to obtain the DSC curves in accordance with heat flux differential scanning calorimetry stipulated in JIS K7122 (1987).

[2] The polylactic resin expanded bead according to above [1], wherein an endothermic calorific value (Bfc:endo) [J/g] and an exothermic calorific value (Bfc:exo) of the center region of the expanded bead, which values are determined in accordance with heat flux differential scanning calorimetry stipulated in JIS K7122 (1987) under Condition 2 shown below, meet the following formula (3):

$$40 > [(Bfc:endo) - (Bfc:exo)] > 10 \quad (3),$$

Condition 2
[Measurement of Endothermic Calorific Value and Exothermic Calorific Value]
the endothermic calorific value (Bfc:endo) and the exothermic calorific value (Bfc:exo) are determined from a DSC curve obtained by heating, for melting, 1 to 4 mg of a measurement specimen, which is sampled by the preparation method for the sample for measuring the endothermic calorific value of the center region of the expanded bead that is described in Condition 1, from 23° C. to a temperature higher by 30° C. than the melt completion temperature thereof at a heating speed of 2° C./min in accordance with heat flux differential scanning calorimetry stipulated in JIS K7122 (1987).

[3] The polylactic resin expanded bead according to above [1] or [2], wherein the expanded bead has an apparent density of 25 to 400 g/L.

[4] The polylactic resin expanded bead according to any one of above [1] to [3], wherein the expanded bead has an average cell diameter of 30 to 500 μm.

[5] The polylactic resin expanded bead according to any one of above [1] to [4], wherein the expanded bead has a core layer comprising a polylactic resin, and an outer layer positioned on a surface side of the core layer and comprising a polylactic resin, wherein a difference [(A)–(B)] between a softening point of (A) [° C.] of the polylactic resin of the core layer and a softening point of (B) [° C.] of the polylactic resin of the outer layer is greater than 0° C. and is not greater than 105° C.

[6] A polylactic resin expanded beads-molded article comprising the polylactic resin expanded beads according to any one of above [1] to [5] which are integrally fuse-bonded together, said molded article having a bulk density of 15 to 300 g/L.

Effect of the Invention

In the polylactic resin expanded bead according to the present invention, since the whole expanded bead shows a specific endothermic calorific value (Br:endo) [J/g], and since an endothermic calorific value (Brs:endo) [J/g] of a surface region of the expanded bead and an endothermic calorific value (Brc:endo) [J/g] of a center region of the expanded bead meet a specific condition, it is easy to control crystallization of the base resin of the expanded beads with the result that polylactic resin expanded beads-molded articles having excellent fuse-bonding can be obtained under an in-mold molding condition involving a wide molding temperature range.

Further, when an endothermic calorific value (Bfc:endo) [J/g] and an exothermic calorific value (Bfc:exo) of the center region of the polylactic resin expanded bead of the present invention meet a specific condition, the expanded beads show good secondary expansion property and resistance to shrinkage during an in-mold molding stage with the result that it becomes easy to control the temperature during the in-mold molding stage and, additionally, shrinkage of the expanded beads-molded articles obtained is low.

Further, when the expanded bead has a core layer of a polylactic resin and an outer layer of another polylactic resin positioned on a surface side of the core layer and when a difference [(A)−(B)] between a softening point (A) [° C.] of the polylactic resin of the core layer and a softening point (B) [° C.] of the polylactic resin of the outer layer is greater than 0° C. and is not greater than 105° C., the above endothermic heat (Br:endo, Brs:endo and Brc:endo) and the like properties can be suitably and appropriately controlled.

Further, the polylactic resin expanded beads-molded article of the present invention has good appearance and excellent fuse-bonding between the expanded beads and, therefore, can sufficiently show both the physical properties that are inherent to the base resin and physical properties imparted through sufficient foaming. In addition to the above improvement in the physical properties, the polylactic resin expanded beads-molded article of the present invention in which the crystallization degree has been sufficiently increased by a heat treatment (heat set) shows further improved mechanical properties during use at room temperature.

EMBODIMENTS OF THE INVENTION

Figure 1:
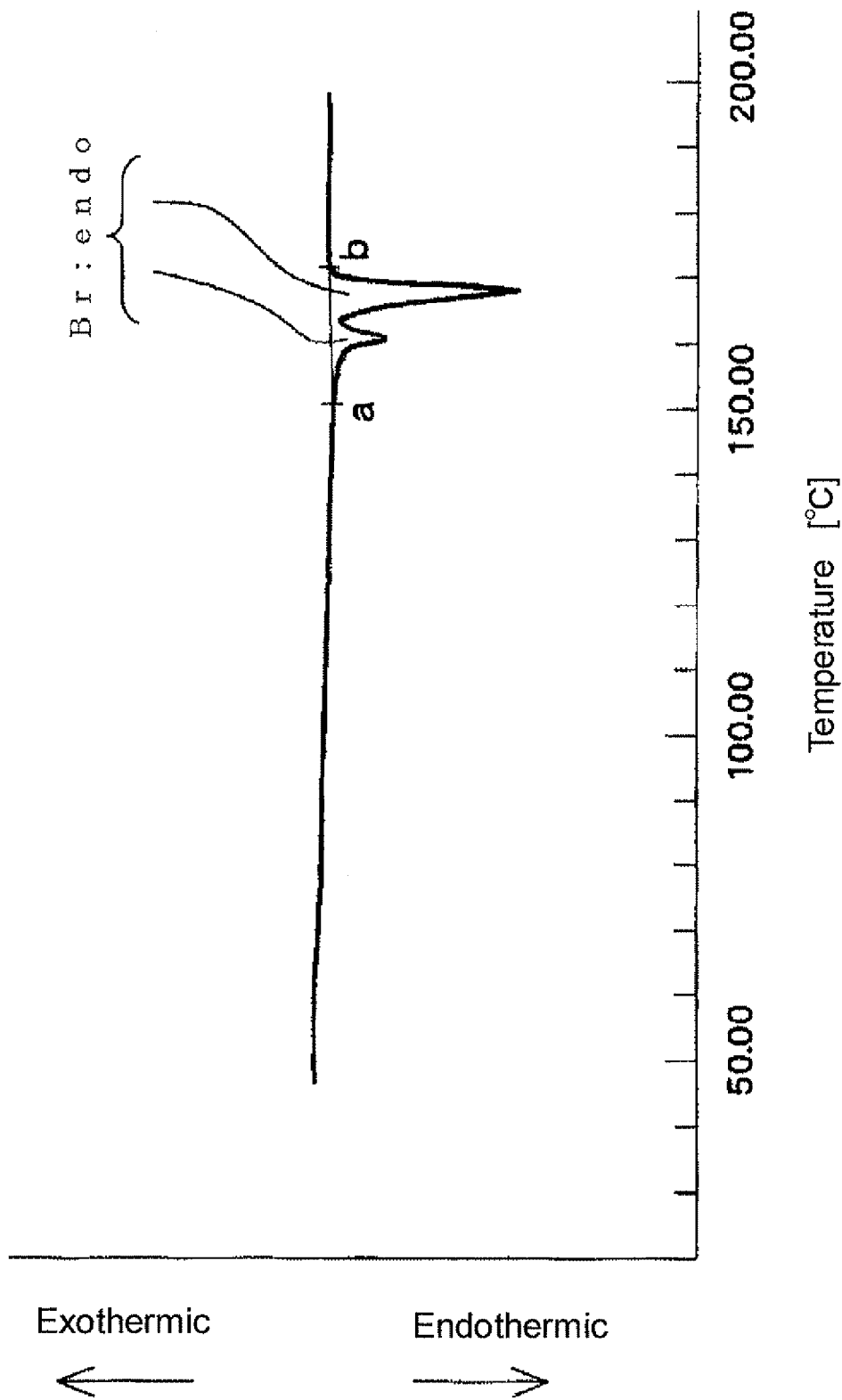
FIG. 1 is an example of a DSC curve showing an endothermic calorific value (Br:endo) of a measurement sample as measured with a heat flux differential scanning calorimeter.

The polylactic resin expanded beads of the present invention will be next described in detail. The polylactic resin expanded beads of the present invention (hereinafter occasionally referred to simply as "expanded beads") are formed of a polylactic resin as a base resin thereof. The term "polylactic resin" as used herein is intended to refer to polylactic acid or a mixture of polylactic acid with other resin or resins. The polylactic acid is preferably a polymer containing at least 50 mol % of lactic acid monomer component units. Examples of the polylactic acid include (a) a polymer of lactic acid, (b) a copolymer of lactic acid with other aliphatic hydroxycarboxylic acid or acids, (c) a copolymer of lactic acid with an aliphatic polyhydric alcohol and an aliphatic polycarboxylic acid, (d) a copolymer of lactic acid with an aliphatic polycarboxylic acid, (e) a copolymer of lactic acid with an aliphatic polyhydric alcohol, and (f) a mixture of two or more of (a)-(e) above. Examples of the polylactic acid also include so-called stereocomplex polylactic acid and stereoblock polylactic acid. Specific examples of the lactic acid include L-lactic acid, D-lactic acid, DL-lactic acid, a cyclic dimer thereof (i.e. L-lactide, D-lactide or DL-lactide) and mixtures thereof.

Examples of other aliphatic hydroxycarboxylic acid in (b) above include glycolic acid, hydroxybutyric acid, hydroxyvaleric acid, hydroxycaproic acid and hydroxyheptoic acid. Examples of the aliphatic polyhydric alcohol in (c) and (e) above include ethylene glycol, 1,4-butanediol, 1,6-hexanediol, 1,4-cyclohexanedimethanol, neopentyl glycol, decamethylene glycol, glycerin, trimethylolpropane and pentaerythritol. Examples of the aliphatic polycarboxylic acid in (c) and (d) above include succinic acid, adipic acid, suberic acid, sebacic acid, dodecanedicarboxylic acid, succinic anhydride, adipic anhydride, trimesic acid, propanetricarboxylic acid, pyromellitic acid and pyromellitic anhydride.

As specific examples of the method for preparing polylactic acid used in the present invention, there may be mentioned a method in which lactic acid or a mixture of lactic acid and aliphatic hydroxycarboxylic acid is subjected to a direct dehydration polycondensation (preparation method disclosed, for example, in U.S. Pat. No. 5,310,865); a method in which a cyclic dimer of lactic acid (namely lactide) is subjected to ring-open polymerization (preparation method disclosed, for example, in U.S. Pat. No. 2,758,987); a method in which cyclic dimers of lactic acid and an aliphatic hydroxycarboxylic acid, such as lactide and glycolide, and ε-caprolactone are subjected to ring-open polymerization (preparation method disclosed, for example, in U.S. Pat. No. 4,057,537); a method in which a mixture of lactic acid, an aliphatic dihydric alcohol and an aliphatic dibasic acid is subjected to direct dehydration polycondensation (disclosed, for example, in U.S. Pat. No. 5,428,126); a method in which lactic acid, an aliphatic dihydric alcohol and an aliphatic dibasic acid are subjected to polycondensation in an organic solvent (preparation method disclosed, for example, in EP-A-0712880A2); and a method in which a lactic acid polymer is subjected to dehydration polycondensation in the presence of a catalyst to produce a polyester and in which at least one step of polymerization in a solid phase is involved during the course of the polycondensation. The method for producing polylactic acid is not limited to the above methods. The above methods may be performed in the presence of a minor amount of an aliphatic polyhydric alcohol (e.g. glycerin), an aliphatic polybasic acid (e.g. butanetetracarboxylic acid) or polyhydric alcohol (e.g. polysaccharide) to obtain a copolymer. It is also possible to use a binder (polymer chain extender) such as a polyisocyanate compound to increase the molecular weight. The polylactic acid may also be branched using a branching agent, typically an aliphatic polyhydric alcohol such as pentaerythritol.

The polylactic acid used in the present invention is preferably capped at its molecular chain ends. By this, it is possible to surely suppress hydrolysis during the course of the preparation of polylactic resin expanded beads, so that polylactic resin expanded beads capable of withstanding in-mold molding can be obtained with ease and, additionally, a polylactic resin expanded beads-molded article (hereinafter occasionally referred to simply as "expanded beads-molded article") obtained by in-mold molding has improved durability.

Examples of such an end capping agent include carbodiimide compounds, oxazoline compounds, isocyanate compounds and epoxy compounds. Above all, carbodiimide compounds are preferred. Specific examples of the diimide compounds include an aromatic monocarbodiimide such as bis(dipropylphenyl)carbodiimide (e.g. Stabaxol I-LF produced by Rhein Chemie), an aromatic polycarbodiimide (e.g. Stabaxol P produced by Rhein Chemie and Stabaxol P400 produced by Rhein Chemie) and an aliphatic polycarbodiimide such as poly(4,4'-dicyclohexylmethanecarbodiimide (e.g. Carbodilite LA-1 produced by Nisshinbo Chemical Inc.).

These end capping agents may be used alone or in combination of two or more thereof. The using amount of the end capping agent is preferably 0.1 to 5 parts by weight, more preferably 0.5 to 3 parts by weight, per 100 parts by weight of the polylactic acid.

Thus, the polylactic acid used in the present invention is preferably a modified polylactic resin that is modified with at least one modifying agent selected from the group consisting of carbodiimide compounds, epoxy compounds and isocyanate compounds, more preferably a modified polylactic acid modified with a carbodiimide compound.

As described previously, the base resin from which the expanded beads of the present invention are formed, may contain other resin or resins as long as the object and effect of the present invention are not adversely affected. In this case, the endothermic calorific values and exothermic calorific values in the above-described requirements may change by the addition of other resin or resins. When a mixed resin containing polylactic acid and other resin or resins is used as the base resin, it is not necessary that the base resin should meet the requirements concerning the endothermic calorific values and exothermic calorific values. Rather, it is necessary that only the polylactic acid contained in the mixed resin (base resin) should meet the requirements concerning the endothermic calorific values and exothermic calorific values. The amount of the polylactic acid contained in the mixed resin composed of the polylactic acid and other resin or resins is preferably at least 50% by weight, more preferably at least 70% by weight, still more preferably at least 90% by weight.

Examples of the other resin to be mixed with the polylactic acid include a polyethylene resin, a polypropylene resin, a polystyrene resin and a polyester resin. Above all, the use of a biodegradable aliphatic polyester resin containing at least 35 mol % of aliphatic ester component units is preferred. Examples of the aliphatic polyester resin include a polycondensation product of a hydroxyacid other than polylactic acid resins, a ring open polymerization product of a lactone (e.g. polycaprolactone), and a polycondensation product of an aliphatic polyhydric alcohol with an aliphatic polycarboxylic acid, such as polybutylene succinate, polybutylene adipate, polybutylene succinate adipate and poly(butylene adipate terephthalate).

Colored expanded particles and expanded particles-molded articles may be obtained by any customarily employed coloring method such as by incorporation of a coloring pigment or dye of black, gray, brown, blue, green or any desired color into the base resin of the expanded particles. To be more specific, colored polylactic resin expanded beads and expanded beads-molded articles may be obtained by adding a coloring pigment or dye to a pressure resistant closed vessel together with polylactic resin particles, a dispersing agent and a blowing agent, when the expanded beads of the present invention are prepared by a dispersion-release foaming method. As the coloring agent, there may be mentioned organic and inorganic pigments and dyes. Customarily known pigments and dyes may be used.

Examples of additives that may be compounded in the expanded beads of the present invention include a flame retardant, an antistatic agent, a weatherability agent and an electric conductivity imparting agent in addition to the above-described colorant. In view of possible disposition or recycling, the use of a large amount of the additives is undesirable.

When the base resin is directly mixed with additives such as a coloring pigment or dye, the additives may be kneaded as such together with the base resin. In view of dispersing efficiency, however, the additives are generally formed into a master batch which is then kneaded with the base resin. The additives are preferably added in an amount of 0.001 to 20 parts by weight, more preferably 0.01 to 5 parts by weight, per 100 pars by weight of the base resin, though the amount varies with the kind of the additives.

In the polylactic resin expanded bead according to the present invention in which a polylactic resin is used as a base resin, the whole expanded bead shows a specific endothermic calorific value (Br:endo) [J/g], and an endothermic calorific value (Brs:endo) [J/g] of a surface region of the expanded bead and an endothermic calorific value (Brc:endo) [J/g] of a center region of the expanded bead meet a specific condition. These characteristics will be described in detail below.

In the polylactic resin expanded bead according to the present invention, an endothermic calorific value (Br:endo) [J/g] of the whole expanded bead after a heat treatment, which is determined in accordance with heat flux differential scanning calorimetry under Condition 1 described below, must meet the following formula (1):

$$(Br:endo) > 25 \qquad (1)$$

The fact that (Br:endo) exceeds 25 [J/g] as indicated in the above formula (1) means that, when the expanded bead is heat treated under such conditions that crystallization of the polylactic acid which constitutes the expanded bead sufficiently proceeds, the amount of the polylactic acid crystal components in the expanded bead is large. Namely, when the heat treatment is carried out sufficiently, the crystallization degree of the polylactic acid which constitutes the expanded bead is increased, so that it is possible to obtain an expanded beads-molded article having an increased degree of crystallization. Therefore, it is expected that the obtained expanded beads-molded article will show improved mechanical strength and heat resistance such as compressive strength at a high temperature. From this point of view, (Br:endo) is preferably 30 [J/g] or more, more preferably 35 [J/g] or more. The upper limit of (Br:endo) is generally 70 [J/g], preferably 60 [J/g].

In the expanded bead according to the present invention, an endothermic calorific value (Brs:endo) [J/g] of a surface region of the expanded bead after the heat treatment and an endothermic calorific value (Brc:endo) [J/g] of a center region of the expanded bead after the heat treatment must meet the following formula (2):

$$(Brc:endo) > (Brs:endo) \geq 0 \qquad (2).$$

The fact the above formula (2) is met means that when the expanded bead is heat treated under such conditions that crystallization of the polylactic acid which constitutes the surface region and center region of the expanded bead sufficiently proceeds, the amount of the polylactic acid crystal components that constitute the surface region of the expanded bead is smaller than the amount of the polylactic acid crystal components that constitute the center region of the expanded bead. Namely, when the expanded bead which meets the formula (2) is sufficiently heat treated, the crystallization degree of the polylactic acid is increased in the center region of the expanded bead. Thus, the above fact means that the expanded bead as a whole can meet the above-described formula (1) as a consequence of the increase of the crystallization degree mainly in the center region of the expanded bead. Therefore, the expanded bead which meets the formula (2) can show improved heat resistance as a whole, when heat treated.

On the other hand, since the polylactic acid in the surface region of the expanded bead has a lower crystallization degree as compared with that in the center region of the expanded bead even when the expanded bead is sufficiently heat treated, the softening point of surface region of the expanded bead which satisfies the formula (2) is low. Therefore, such expanded bead is capable of showing excellent fuse-bonding between the expanded beads during an in-mold molding stage, irrespective of the thermal history before and after the production of the expanded beads. From this point of view, (Brs:endo) [J/g] of the surface region of the expanded bead is preferably 35 J/g or less (inclusive of 0). For reasons of improved heat resistance and mechanical strength of the center region of the expanded bead, (Brc:endo) is preferably 30 J/g or more, more preferably 35 J/g or more. The upper limit of (Brc:endo) is generally 70 J/g, preferably 60 J/g.

It is also preferred that between (Brc:endo) and (Brs:endo) there is a difference in calorific value of at least 3 J/g, more preferably at least 4 J/g. Meanwhile, as long as the formula (2) is met, the polylactic acid that constitutes the surface region of the expanded bead may be non-crystalline polylactic acid or a mixture of non-crystalline polylactic acid and crystalline polylactic acid.

It is preferred that a great difference between (Brc:endo) and (Brs:endo) values for the reasons as described above, such as fuse-bonding. In actual, however, a great difference is not seen between them. The reason for this is considered to be as follows. Namely, when a polylactic resin particle used for the formation of the expanded bead has, for example, a structure composed of a core layer and an outer layer which is positioned on a surface side of the core layer and which has a softening point differing from that of the core layer by a specific difference, it is difficult to cut out a measurement specimen (for the measurement of (Brs:endo) of the surface region of the expanded bead) only from the outer layer of the expanded bead. Thus, the measurement specimen of the surface region for the measurement of (Brs:endo) inevitably includes a part of the core layer in addition to the outer layer. As a consequence, the measured value of (Brs:endo) does not greatly differ from that of (Brc:endo).

As used herein, the endothermic calorific value (Br:endo) [J/g] of the whole expanded bead, the endothermic calorific value (Brs:endo) [J/g] of a surface region of the expanded bead and the endothermic calorific value (Brc:endo) [J/g] of a center region of the expanded bead are values as determined in accordance with heat flux differential scanning calorimetry referenced in JIS K7122 (1987) under the following Condition 1.

Condition 1
[Preparation of Measurement Specimens]
<Specimen for Measuring the Endothermic Calorific Value of the Whole Expanded Bead>
The expanded bead is basically used as a measurement specimen as such without cutting.

<Specimen for Measuring the Endothermic Calorific Value of the Surface Region of the Expanded Bead>
A surface portion of the expanded bead, including an exterior surface thereof, is cut out and collected to obtain a measurement specimen, such that the entire exterior surface thereof is removed and the measurement specimen has a weight of ⅙ to ¼ the weight of the expanded bead before being cut. More specifically, the expanded bead is cut using a cutter knife, a microtome or the like for collecting the surface portion as the measurement specimen. In this case, it should be borne in mind that the entire exterior surface of the expanded bead should be removed and the weight of the surface portion removed from the bead should be within the range of ⅙ to ¼ the weight of the expanded bead before being cut.

<Specimen for Measuring the Endothermic Calorific Value of the Center Region of the Expanded Bead>
An entire surface portion of the expanded bead is cut away to leave a measurement specimen, such that the measurement specimen has a weight of ⅕ to ⅓ the weight of the expanded bead before being cut. More specifically, the expanded bead is cut using a cutter knife or the like for the purpose of obtaining an inside region of the foam of the expanded bead which region does not include the exterior surface of the expanded bead. It should be borne in mind that the entire exterior surface of the expanded bead should be removed and a center region of the expanded bead which has a weight of ⅕ to ⅓ the weight of the expanded bead before being cut should be cut out, with the center of the center region being made as close to the center of the expanded bead as possible. In this case, the shape of the measurement specimen thus cut out is desired to be as similar as possible to the shape of the expanded bead.

[Measurement of Endothermic Calorific Values]
The calorific values (Br:endo), (Brs:endo) and (Brc:endo) are values as determined from DSC curves obtained by first subjecting each of the expanded bead, the measurement specimen obtained from the surface region of the expanded bead and the measurement specimen obtained from the center region of the expanded bead to a heat treatment in which 1 to 4 mg of each of them is heated, for melting, to a temperature higher by 30° C. than a melt completion temperature thereof, then maintained at that temperature for 10 minutes, then cooled to 110° C. at a cooling speed of 2° C./min and then maintained at that temperature for 120 min, and then cooling the resulting sample to 40° C. at a cooling speed of 2° C./min, each of the thus heat treated specimens being subsequently heated again, for melting, to a temperature higher by 30° C. than the melt completion temperature at a heating speed of 2° C./min to obtain the DSC curve (hereinafter occasionally referred to as "second time DSC curve") in accordance with heat flux differential scanning calorimetry referenced in JIS K7122 (1987). When the amount of the measurement specimen sampled for measurement of (Brs:endo) or (Brc:endo) is less than the intended amount of 1 to 4 mg, the above-described sampling procedure should be repeated for two or more expanded beads until the measurement specimen in the intended amount of 1 to 4 mg is collected. When the weight of one expanded bead exceeds 4 mg, the expanded bead should be divided into parts with an equal shape (such as into halves) so that the measurement specimen has a weight within the range of 1 to 4 mg.

Thus, (Br:endo), (Brc:endo) and (Brc:endo) of the expanded beads of the present invention may be measured and defined for specimens sampled in the manner described below:
(a) surface portions of a randomly selected one of the expanded beads are cut out and collected to obtain a first specimen such that the entire outer peripheral surface of the expanded bead is removed and the first specimen has a weight of one-sixth to one-fourth the weight of the expanded bead before being cut;

(b) when the weight of the first specimen thus collected is less than 1 mg, the above procedure (a) is repeated for one or more randomly selected expanded beads until a total of 1 to 4 mg of the first specimen is obtained;

(c) surface portions of another expanded bead randomly selected from the expanded beads are cut away to leave a second specimen, such that the outer peripheral surface thereof is entirely removed and the second sample has a weight of one-fifth to one-third the weight of the expanded bead before being cut;

(d) when the weight of the second specimen thus obtained is less than 1 mg, the above procedure (c) is repeated for one or more randomly selected beads until a total of 1 to 4 mg of the second specimen is obtained;

(e) a further expanded bead is randomly selected from the expanded beads to obtain a third sample;

(f) each of the first to third specimens is subjected to heat flux differential scanning calorimetry in accordance with JIS K7122 (1987) in such a manner that 1 to 4 mg of each of the first to third specimens is first heat treated by a method including heating each specimen to a temperature higher by 30° C. than a melt completion temperature thereof, maintaining the heated specimen at that temperature for 10 minutes, cooling the resulting specimen to 110° C. at a cooling speed of 2° C./min and maintaining same at that temperature for 120 min, and then cooling the resulting specimen to 40° C. at a cooling speed of 2° C./min, the thus heat treated specimen being thereafter heated to a temperature higher by 30° C. than the melt completion temperature at a heating speed of 2° C./min to determine a DSC curve thereof; and (g) (Brs:endo) is a calorific value of the endothermic peak in the DSC curve of the first specimen, (Brc:endo) is a calorific value of the endothermic peak in the DSC curve of the second specimen and (Br:endo) is a calorific value of the endothermic peak in the DSC curve of the third specimen.

Figure 2:
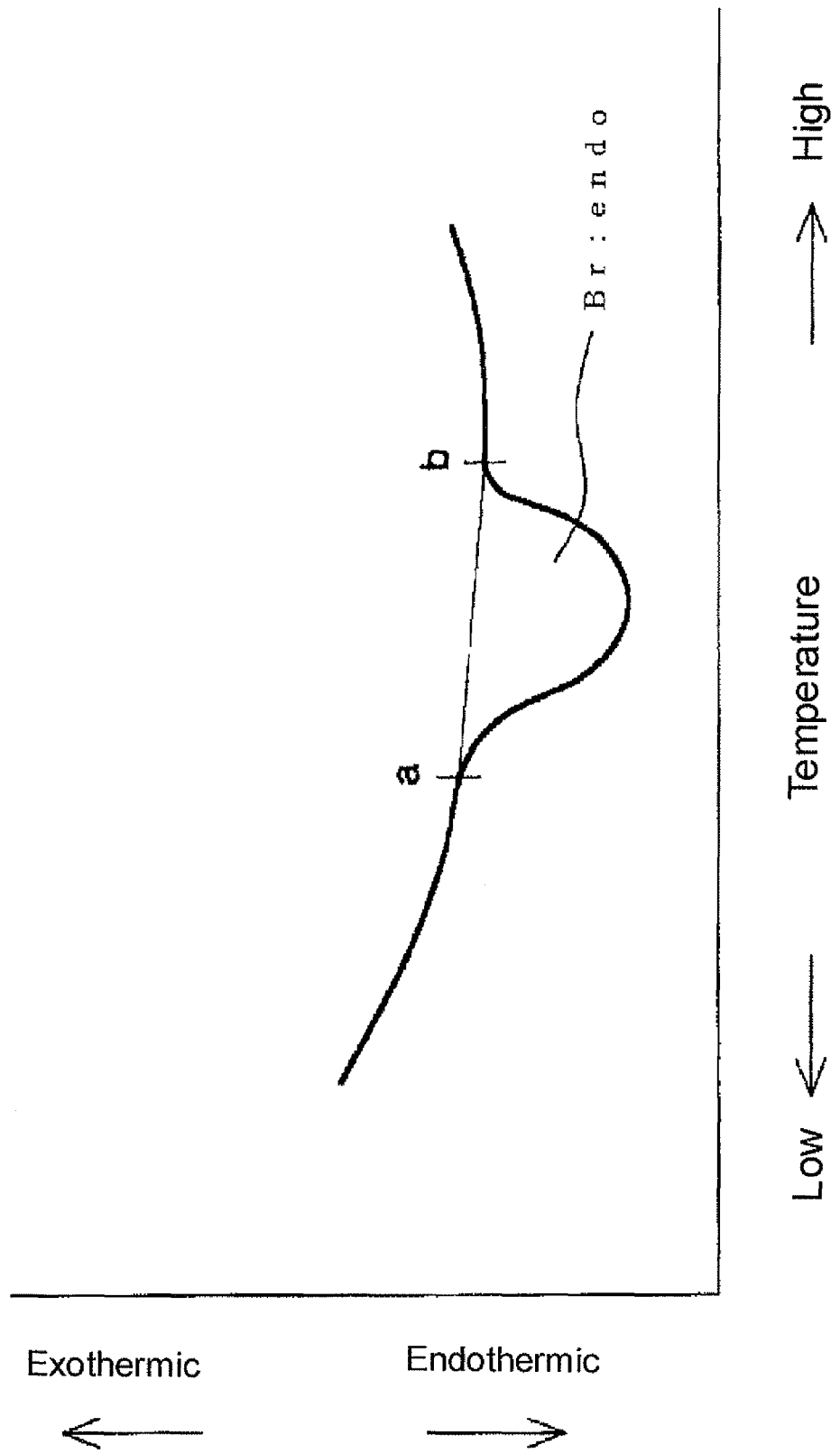
FIG. 2 an example of a DSC curve showing an endothermic calorific value (Br:endo) of a measurement sample as measured with a heat flux differential scanning calorimeter.

FIG. 1 shows a second time DSC curve in which a point "a" is a point where an endothermic peak begins separating from a low temperature-side base line and a point "b" is a point where the endothermic peak returns to a high temperature-side base line. The endothermic calorific value (Br:endo) is an area defined by a line passing the points "a" and "b" and the DSC curve. The DSC device should be preferably operated so that the base line is as straight as possible. When the base line is inevitably curved as shown in FIG. 2, the curved base line on the low temperature side is extended to the high temperature side with the radius of the curvature of the base line being maintained. The point at which the endothermic peak begins separating from the low temperature side curved base line is the point "a". Similarly, the curved base line on the high temperature side is extended to the low temperature side with the radius of the curvature of the base line being maintained. The point at which the endothermic peak returns to the high temperature side curved base line is the point "b". The endothermic calorific values (Brs:endo) and (Brc:endo) may also be obtained from their second DSC curves by drawing base lines in the same manner as in the case of and may be each determined from the area defined by a line passing the points "a" and "b" and the DSC curve.

In the above-described measurement of the endothermic calorific values (Br:endo), (Brs:endo) and (Brc:endo), each of the specimens is measured for its DSC curve under conditions including the maintenance at 110° C. for 120 minutes, cooling at a rate of 2° C./min and heating at a rate of 2° C./min. This is for the purpose of determining the endothermic calorific values (Br:endo), (Brs:endo) and (Brc:endo) in the state in which crystallization of the polylactic resin of each specimen has been allowed to proceed as much as possible.

Because the polylactic resin expanded bead according to the present invention as a whole has the above-described specific (Br:endo), when such expanded beads are in-mold molded after having been subjected to a heat treatment or when such expanded beads are in-mold molded and then subjected to a heat treatment, the resulting expanded beads-molded article shows excellent mechanical strength and high compressive strength at an elevated temperature. Further, whilst the whole polylactic resin expanded bead shows the specific endothermic calorific value (Br:endo) as described above, the softening point of the surface of the expanded bead may be maintained in a low level irrespective of the thermal history of the expanded bead, since the endothermic calorific value (Brs:endo) of the surface region of the expanded bead is lower than the endothermic calorific value (Brc:endo) of the center region thereof. Therefore, the expanded bead of the present invention shows excellent fuse-bonding property when subjected to in-mold molding.

It is preferred that the polylactic resin expanded bead of the present invention be such that an endothermic calorific value (Bfc:endo) [J/g] and an exothermic calorific value (Bfc:exo) of the center region of the expanded bead before being subjected to the heat treatment, which values are determined in accordance with heat flux differential scanning calorimetry referenced in JIS K7122 (1987) under Condition 2 shown below, meet the following formula (3):

$$40 > [(Bfc{:}endo) - (Bfc{:}exo)] > 10 \quad (3)$$

Condition 2

[Preparation of Measurement Specimen]

[Measurement Specimen for Measuring Endothermic Calorific Value and Exothermic Calorific Value of the Center Region of the Expanded Bead]

In the same manner as the preparation method for the specimen for measuring the endothermic calorific value of the center region of the expanded bead that is described in Condition 1, an entire surface portion of the expanded bead is cut away to leave a measurement specimen, such that the measurement specimen has a weight of ⅕ to ⅓ the weight of the expanded bead before being cut.

[Measurement of Endothermic Calorific Value and the Exothermic Calorific Value]

The endothermic calorific value (Bfc:endo) and the exothermic calorific value (Bfc:exo) are determined from a DSC curve (hereinafter occasionally referred to as "first time DSC curve") obtained by heating, for melting, 1 to 4 mg of the measurement specimen, sampled from the center region of the expanded bead, from 23° C. to a temperature higher by 30° C. than the melt completion temperature thereof at a heating speed of 2° C./min in accordance with heat flux differential scanning calorimetry referenced in JIS K7122 (1987). When the amount of the measurement specimen sampled from one expanded bead is less than the intended amount of 1 to 4 mg, the above-described sampling procedure should be repeated for a plurality of expanded beads until 1 to 4 mg of a measurement specimen is collected.

Thus, (Bfc:endo) and (Bfc:exo) of the expanded beads of the present invention may be measured and defined as described below:

(h) surface portions of a randomly selected one of the expanded beads is cut away to leave a fourth sample, such that the entire exterior surface is removed and the fourth sample has a weight of one-fifth to one-third the weight of the expanded bead before being cut, (i) when the weight of the fourth specimen thus obtained is less than 1 mg, the above procedure (h) is repeated for one or more additionally randomly selected expanded beads until a total of 1 to 4 mg of the fourth specimen is obtained;

(j) 1 to 4 mg of the fourth sample is subjected to heat flux differential scanning calorimetry in accordance with JIS K7122 (1987) wherein 1 to 4 mg of the fourth sample is heated from 23° C. to a temperature higher by 30° C. than a melt completion temperature thereof at a heating speed of 2° C./min, thereby to obtain a DSC curve thereof; and (k) (Bfc:endo) and (Bfc:exo) are calorific values of the endothermic peak and exothermic peak in the DSC curve of the fourth sample, respectively.

The difference [(Bfc:endo)–(Bfc:exo)] in the above formula (3) represents a difference between the endothermic calorific value (Bfc:endo) that is an energy absorbed when the crystals, which are originally contained in the center region of the expanded bead before the heat flux differential scanning calorimetry measurement is carried out, and crystals, which have been formed in the center region of the expanded bead during the course of heating in the measurement, are melted and the exothermic calorific value (Bfc:exo) that is an energy emitted when the center region of the expanded bead crystallizes during the course of heating in the heat flux differential scanning calorimetry measurement. The fact that the difference is small means that crystallization of the center region of the expanded bead has not yet proceeded before the heat flux differential scanning calorimetry is carried out, while the fact that the difference is large and is near the endothermic calorific value (Bfc:endo) means that crystallization of the center region of the expanded bead has already fully proceeded before the heat flux differential scanning calorimetry is carried out. The difference [(Bfc:endo)–(Bfc:exo)] is preferably within the above-described range for reasons that good secondary expansion property of the expanded bead during an in-mold molding stage is achieved and, further, the range of the molding temperature within which good expanded beads-molded articles are obtainable becomes wide. The difference is more preferably 35 J/g or less, particularly preferably 30 J/g or less, from the view point of the secondary expansion property.

From the view point of easiness in controlling the temperature of in-mold molding step as well as prevention of shrinkage of the in-mold molded articles, the difference [(Bfc:endo)–(Bfc:exo)] is preferably 15 J/g or more, particularly preferably 20 J/g or more.

It is also preferred that the endothermic calorific value (Bfc:endo) of the expanded bead of the present invention is 30 to 70 J/g. With an increase of the endothermic calorific value (Bfc:endo), the degree of crystallization of the polylactic resin of which the expanded bead is formed becomes higher upon a heat treatment of the expanded bead, so that the expanded beads-molded article prepared therefrom has higher mechanical strength. When the endothermic calorific value (Bfc:endo) is excessively small, on the other hand, there is a possibility that the mechanical strength, especially mechanical strength at high temperatures, of the final expanded beads-molded article is unsatisfactory. From this point of view, (Bfc:endo) is more preferably 35 J/g or more. The upper limit of (Bfc:endo) is generally 70 J/g, preferably 60 J/g.

The exothermic calorific value (Bfc:exo)] is preferably 5 to 30 J/g, more preferably 10 to 25 J/g, for reasons of good secondary expansion property and moldability of the expanded bead, in view of controllability of the difference [(Bfc:endo)–(Bfc:exo)] and the endothermic calorific value (Bfc:endo). The fact that the exothermic calorific value (Bfc:exo) is high means that crystallization of the center region of the expanded bead formed of a crystalline has not yet proceeded before the heat flux differential scanning calorimetry is carried out.

The exothermic calorific value (Bfc:exo)] and the endothermic calorific value (Bfc:endo) are determined by the heat flux differential scanning calorimetry (Condition 2) in accordance with JIS K7122 (1987), as described previously. The measurement of the exothermic calorific value (Bfc:exo)] and the endothermic calorific value (Bfc:endo) is carried out as follows.

In a first time DSC curve, when a point where the exothermic peak begins separating from a low temperature-side base line of the exothermic peak is assigned as point "c" and a point where the exothermic peak returns to a high temperature-side base line is assigned as point "d", the exothermic calorific value (Bfc:exo) is a calorific value determined from the area defined by a line passing the points "c" and "d" and the DSC curve. In the first time DSC curve, when a point where the endothermic peak begins separating from a low temperature-side base line is assigned as point "e" and a point where the endothermic peak returns to a high temperature-side base line is assigned as point "f", the endothermic calorific value (Bfc:endo) is a calorific value determined from the area defined by a line passing the points "e" and "f" and the DSC curve. The DSC device should be preferably operated so that the base line is as straight as possible. When the base line is inevitably curved, the curved base line on the low temperature side is extended to the high temperature side with the radius of the curvature of the base line being maintained. The point at which the exothermic peak begins separating from the low temperature side curved base line is the point "c". Similarly, the curved base line on the high temperature side of the exothermic peak is extended to the low temperature side with the radius of the curvature of the base line being maintained. The point at which the exothermic peak returns to the high temperature side curved base line is the point "d". Further, the curved base line on the low temperature side of the endothermic peak is extended to the high temperature side with the radius of the curvature of the base line being maintained. The point at which the endothermic peak begins separating from the low temperature side curved base line is the point "e". Similarly, the curved base line on the high temperature side of the endothermic peak is extended to the low temperature side with the radius of the curvature of the base line being maintained. The point at which the endothermic peak returns to the high temperature side curved base line is the point "f".

Figure 3:
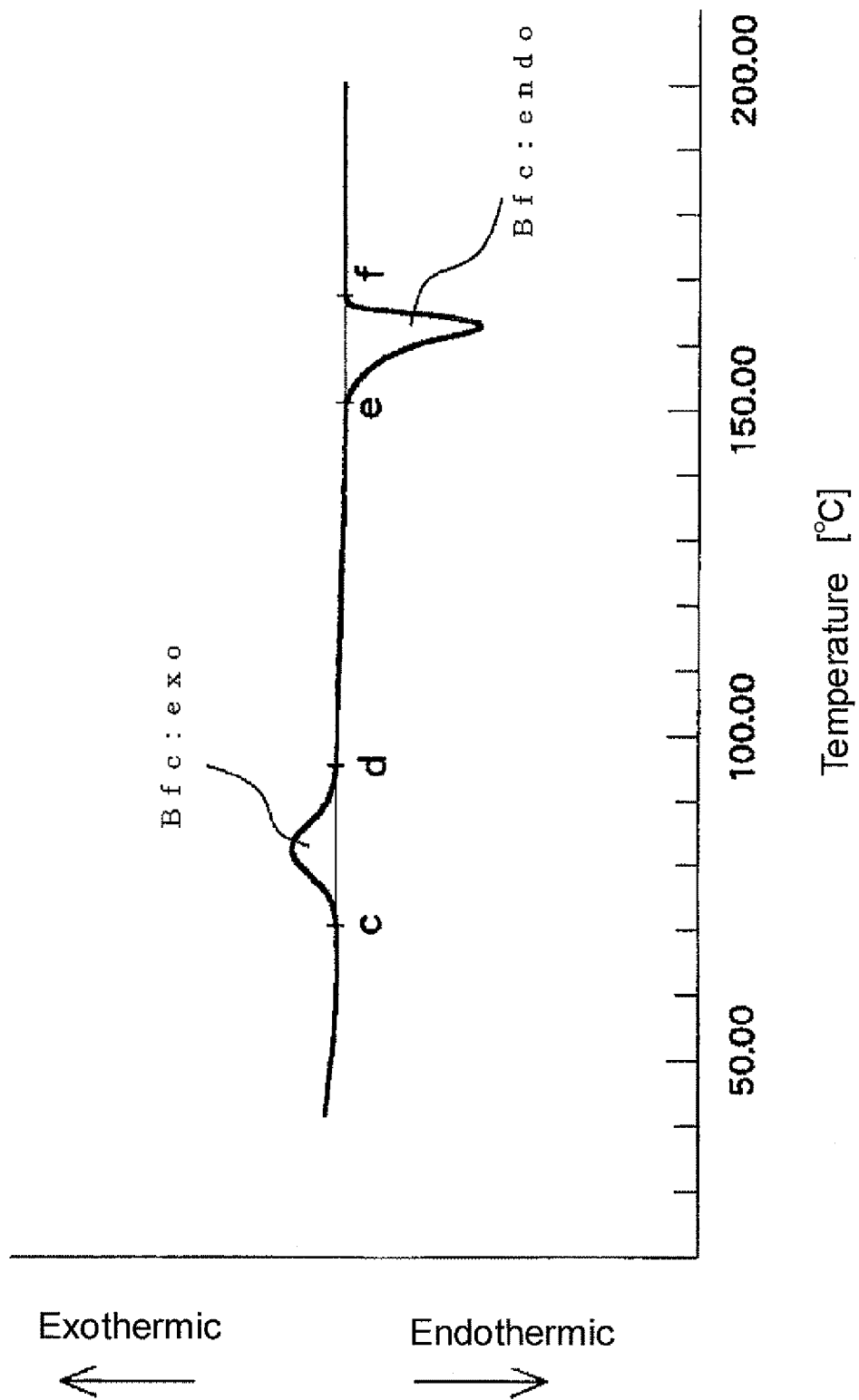
FIG. 3 is an example of a DSC curve showing an exothermic calorific value (Bfc:exo) and an endothermic calorific value (Bfc:endo) of a measurement sample as measured with a heat flux differential scanning calorimeter.
Figure 4:
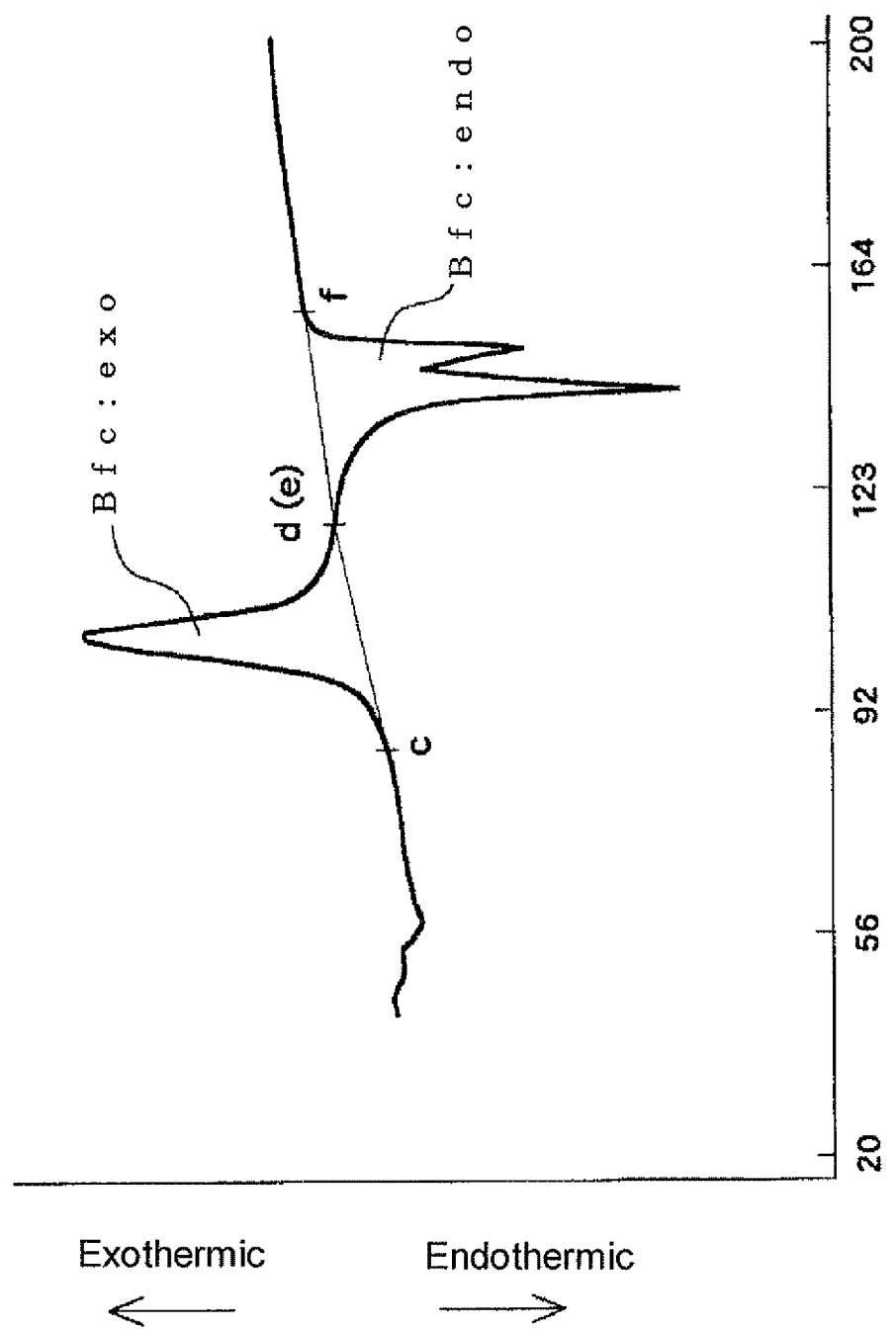
FIG. 4 is an example of a DSC curve showing an exothermic calorific value (Bfc:exo) and an endothermic calorific value (Bfc:endo) of a measurement sample as measured with a heat flux differential scanning calorimeter.
Figure 5:
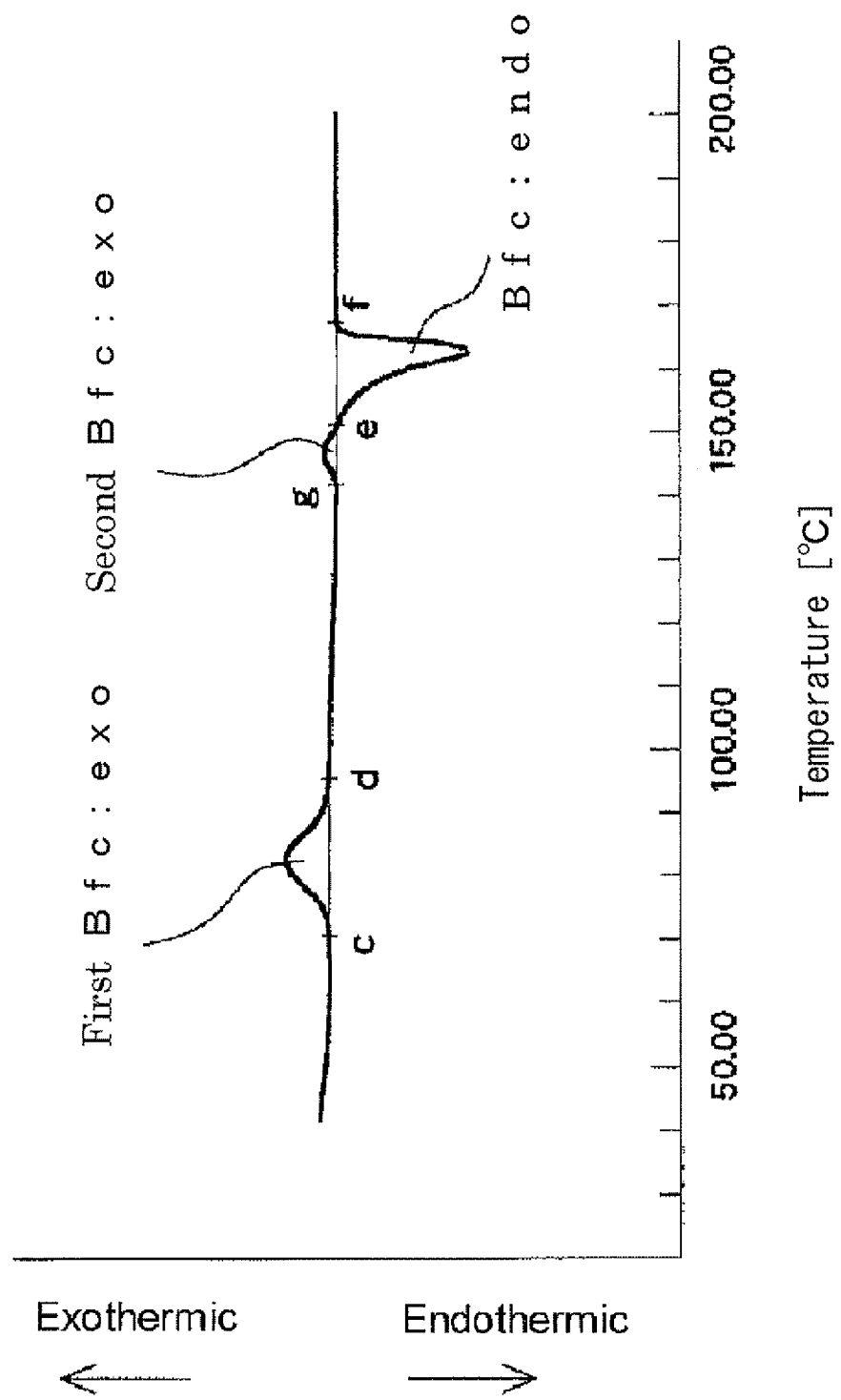
FIG. 5 is an example of a DSC curve showing an exothermic calorific value (Bfc:exo) and an endothermic calorific value (Bfc:endo) of a measurement sample as measured with a heat flux differential scanning calorimeter.

In the case of FIG. 3, for example, an exothermic calorific value (Bfc:exo) is determined from the area which is defined by the straight line passing the points "c" and "d", that are determined in the manner described above, and the DSC curve and which represents the generated calorific value, while an endothermic calorific value (Bfc:endo) is a calorific value determined from the area which is defined by the straight line passing the points "e" and "f" and the DSC curve and which represents the absorbed calorific value. In the case of FIG. 4, it is difficult to determine points "d" and "e" by the above-described method. Thus, in the illustrated case, points "c" and "f" are first determined by the above-described method and a point at which the straight line passing the points "c" and "f" intersects the DSC curve is assigned as the point "d" (also point "e"), whereupon the exothermic calorific value (Bfc:exo) and the endothermic calorific value (Bfc:endo) of the expanded bead are determined. As shown in FIG. 5, there is a case in which a small exothermic peak exists on a low temperature side of the endothermic peak. In such a case, the exothermic calorific value (Bfc:exo) is determined from a sum of an area "A" of the first exothermic peak and an area "B" of the second exothermic peak. Namely, when a point where the exothermic peak begins separating from a low temperature-side base line of the first exothermic peak is assigned as point "c" and a point where the first exothermic peak returns to a high temperature-side base line is assigned as point "d", the area "A" is an area defined by a straight line passing the points "c" and "d" and the DSC curve and represents the generated calorific value. On the other hand, when a point where the exothermic peak begins separating from a low temperature-side base line of the second exothermic peak is assigned as point "g" and a point where the endothermic peak returns to a high temperature-side base line is assigned as point "f", and when a point where a straight line passing the points "g" and "f" intersects the DSC curve is assigned as point "e", the area "B" is an area defined by a straight line passing the points "g" and "e" and the DSC curve and represents the generated calorific value. In FIG. 5, the endothermic calorific value (Bfc:endo) is a calorific value determined from the area which is defined by the straight line passing the points "e" and "f" and the DSC curve and which represents the absorbed calorific value.

In the measurement of the exothermic calorific value (Bfc: exo) and the endothermic calorific value (Bfc:endo), a heating speed of 2° C./minute is adopted as a condition of the DSC curve measurement for reasons that such a heating speed has been found by the present inventors to be suitable for separating the endothermic and exothermic peaks as clearly as possible from each other and for precisely determining [(Bfc: endo)−(Bfc:exo)] by heat flux differential scanning calorimetry.

The polylactic resin expanded bead that meets the above formulas (3) in addition to the formulas (1) and (2) may be obtained by constituting the expanded bead such that it has a core layer formed of a polylactic resin, and an outer layer covering the core layer and formed of another polylactic resin. In this case it is not necessary that the outer layer should entirely cover the core layer. As long as the expanded bead satisfies the formulas (1) and (2), the resin of which the core layer is formed may be exposed on a part of the surface of the expanded bead.

Figure 6:
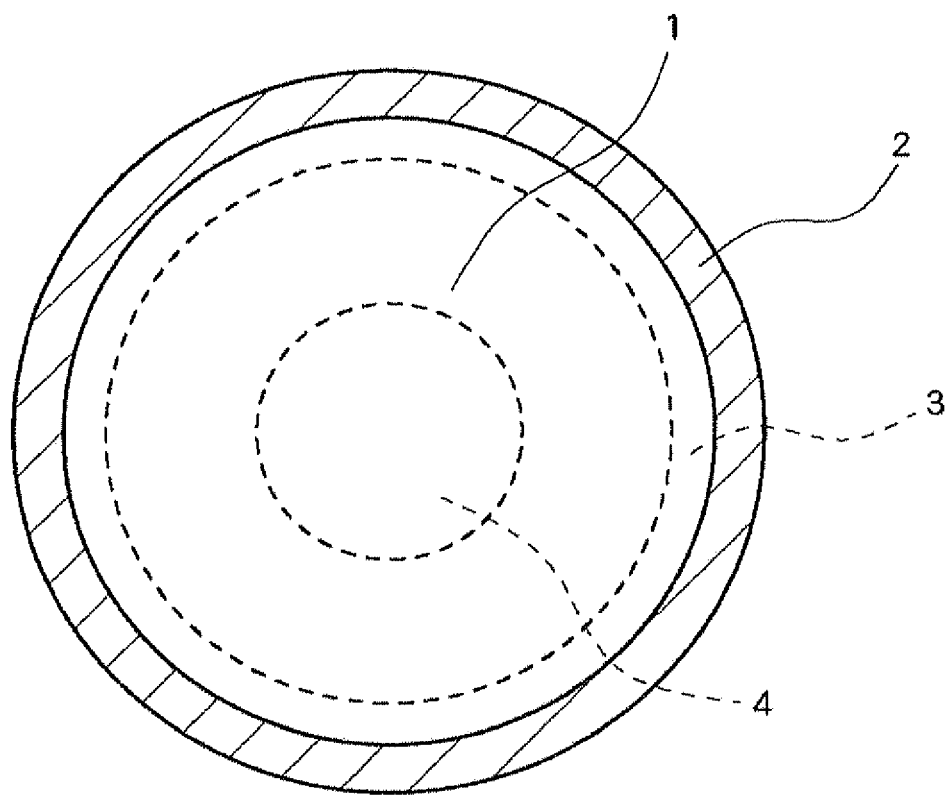
FIG. 6 is an illustration of an expanded bead having a core layer and an outer layer, showing a relationship between a surface region of an expanded bead and a center region thereof.

FIG. 6 illustrate an example of a structural relationship between the above-described surface region 3 and center region 4 in an expanded bead having a core layer 1 and an outer layer 2. Thus, designated as 1 is the core layer (which is an inside section defined by the inner solid line), as 2 is the outer layer (which is a section defined between the outer solid line and inner solid line), as 3 is the surface region of the expanded bead (which is a section defined between the outer solid line and the outer broken line) and as 4 is the center region of the expanded bead (which is an inside section defined by the inner broken line).

It is preferred that the softening point (B) [° C.] of the polylactic resin of which the outer layer is formed be lower than the softening point (A) [° C.] of the polylactic resin of which the core layer is formed and that a difference [(A)−(B)] between the softening point (A) and the softening point (B) be greater than 0° C. and is not greater than 105° C., more preferably from 15 to 105° C., still more preferably from 20 to 105° C. The expanded bead that shows the above specific range of the above difference in softening point may be produced by a method as described hereinafter which includes coextruding polylactic resins with softening points (B) and (A) of the outer and core layers. With such a method, the expanded bead that meets the above formulas (3) in addition to the formulas (1) and (2) may be obtained in an efficient manner. The expanded bead thus obtained show excellent fuse-bonding property during in-mold molding stage in a further stable manner. It is preferred, from the standpoint of handling efficiency of the expanded beads and mechanical strength at elevated temperatures of the expanded beads-molded article, that the softening point (B) of the polylactic resin of the outer layer not only meets the above-mentioned relation to the softening point (A) of the polylactic resin of the core layer but also is 50° C. or more, more preferably 55° C. or more, particularly preferably 65° C. or more.

As used herein, the term "softening point" is intended to refer to a Vicat softening point as measured according to JIS K7206 (1999), Method A50. In particular, a polylactic resin is sufficiently dried in a vacuum oven and pressed at 200° C. and 20 MPa (if necessary, air evacuation is carried out so as to prevent inclusion of air bubbles) to obtain a test piece with a length of 20 mm, a width of 20 mm and a thickness of 4 mm. The test piece is annealed in an oven at 80° C. for 24 hours and then measured using, for example, HDT/VSPT tester Model TM-4123 manufactured by Ueshima Seisakusho Co., Ltd.

In the expanded bead having the core layer and outer layer according to the present invention, it is preferred that the weight ratio of the resin of which the core layer is formed to the resin of which the outer layer is formed be 99.9:0.1 to 80:20, more preferably 99.7:0.3 to 90:10, still more preferably 99.5:0.5 to 92:8. When the proportion of the resin of the outer layer of the expanded bead is excessively small, the thickness of the outer layer thereof becomes excessively thin, with the result that the improvement in fuse-bonding property thereof during an in-mold molding stage is lowered and the fuse-bonding between the expanded beads becomes insufficient. Additionally, there is a possibility that a problem in production efficiency is caused at the time the resin particles are produced. When the proportion of the outer layer resin is excessively large, on the other hand, there is a possibility that the resin of the outer layer will foam more than necessary to cause deterioration of the fuse-bonding property of the expanded beads in an in-mold molding stage. There is also a possibility that the mechanical properties of the expanded beads-molded article may be deteriorated. However, it should be noted that the present invention does not necessarily exclude an embodiment in which the resin of the outer layer is foamed.

When the weight ratio of the resin of the core layer to the resin of the outer layer of the expanded bead falls within the above-described range, fusion-bonding strength between the expanded beads becomes high. Therefore, the mechanical property of the expanded beads-molded article obtained from the expanded beads becomes high. Further, the increase of the proportion of the core layer which contributes to an improvement of the properties of the expanded bead further improve the mechanical properties.

Incidentally, the weight ratio of the resin of the core layer to the resin of the outer layer of the expanded bead may be controlled by a control of the weight ratio of a resin of a core layer to a resin of an outer layer of a polylactic resin particle (hereinafter occasionally referred to as resin particle) which will be described hereinafter.

In the present invention, the above-described end capping agent is preferably used at least in the core layer, more preferably in each of the core and outer layers. When at least the polylactic resin of the core layer, preferably the polylactic resin of each of the core and outer layers, is modified with the end capping agent, it is possible to suppress hydrolysis during the course of the preparation of expanded beads, so that expanded beads can be produced in a stable manner. Further, it is also possible to suppress hydrolysis during the course of the preparation of expanded beads-molded articles so that such molded articles can be produced in a stable manner. Moreover, when the molded articles are subjected to actual use, they are expected to show improved durability and withstand use under a high temperature and high humidity environment.

The thickness of the outer layer is desired to be thin, because cells are hard to be formed in the outer layer and because mechanical properties of the expanded beads-molded article are improved. When the thickness of the outer layer is excessively low, there may be apprehension that the effect of improving fuse-bonding between expanded beads is adversely affected. In actual, however, sufficient fuse-bonding improving effect is achieved when the thickness is in the range described below. Namely, the outer layer of the expanded beads preferably has an average thickness of 0.1 to 20 μm, more preferably 0.2 to 10 μm, particularly preferably 0.3 to 5 μm. The average thickness of the outer layer of the expanded beads may be controlled by a control of the weight ratio of a resin of a core layer to a resin of an outer layer of its precursor resin particles. The outer layer of the resin particles preferably has an average thickness of 2 to 100 μm, more preferably 3 to 70 μm, particularly preferably 5 to 50 μm.

The average thickness of the outer layer of the expanded beads is measured as follows. One expanded bead is cut into nearly equal halves. From a photograph of the enlarged cross section, the thickness of the outer layer in each of the four positions (upper and lower sides, and left and right sides) thereof is measured. The arithmetic mean of the four thickness values is the thickness of the outer layer of the expanded bead. Similar procedures are repeated for a total of 10 expanded beads. The arithmetic mean of the ten thickness values is the average thickness of the outer layer of the expanded beads. The average thickness of the outer layer of the resin particles is also measured by the above method. When the outer layer is formed on parts of the peripheral surface of the core layer, there may arise a case where the thickness of the outer layer cannot be measured at the above four positions. In such a case, the thickness of the outer layer is measured at four randomly selected measurable positions and the arithmetic mean thereof is defined as the thickness of the outer layer of the expanded bead. Also, when the thickness of the outer layer of the expanded bead is not easily determined, it is preferable to produce the expanded beads by incorporating a suitable colorant in the resin of which the outer layer is formed.

The expanded bead of the present invention preferably has an apparent density of 25 to 400 g/L, more preferably 40 to 200 g/L, from the standpoint of lightness in weight, in-mold moldability and excellent mechanical properties. When the apparent density is excessively low, there is a possibility that a shrinkage degree after the in-mold molding becomes high. Too large an apparent density tends to cause an increase of variation in the apparent density, which in turn results in variation in expansion property, fuse-bonding property and apparent density of the expanded beads at the time they are heated and molded in a mold cavity. Thus, there is a possibility that the physical properties of the expanded beads-molded article obtained may be deteriorated.

As used herein, the apparent density of the expanded beads is a density as measured by the following method. The expanded beads are allowed to stand in a constant temperature and humidity room at 23° C. under atmospheric pressure and a relative humidity of 50% for 10 days. In the same room, about 500 mL of the expanded beads thus allowed to stand for 10 days are weighed to determine their weight W1 (g). The weighed the expanded beads are immersed in water at 23° C. contained in a measuring cylinder using a wire net or the like tool. From a rise of the water level volume, the volume V1 of the expanded beads placed in the measuring cylinder is determined by subtracting the volume of the wire net and the like tool placed therein. The apparent density is calculated by dividing the weight W1 of the expanded beads placed in the measuring cylinder by the volume V1 (W1/V1).

The expanded beads of the present invention preferably have an average cell diameter of 30 to 500 μm, more preferably 50 to 250 μm, from the standpoint of their in-mold moldability and improved appearance of the expanded beads-molded article obtained therefrom.

The average cell diameter of the expanded beads is measured as follows. One expanded bead is cut into nearly equal halves. From an enlarged image of the cross section taken by a microscope, the average cell diameter is determined as follows. On the enlarged image of the cross section of the expanded bead, four line segments each passing nearly through the center of the cross section and extending from one surface of the expanded bead to the other surface thereof are drawn such that eight angularly equally spaced straight lines extend radially from nearly the center of the cross section toward the external surface of the expanded bead. A total number (N) of cells that intersect the above four line segments is counted. Also measured is a total length (L (μm)) of the four line segments. The value (L/N) obtained by dividing the total length L by the total number N is an average cell diameter of the one expanded bead. Similar procedures are repeated for 10 expanded beads in total. The arithmetic mean of the average cell diameters of the ten expanded beads represents the average cell diameter of the expanded beads.

The expanded bead of the present invention preferably has a closed cell content of 80% or more, more preferably 85% or more, still more preferably 90% or more. When the closed cell content is excessively small, the expanded bead tends to deteriorate in its secondary expansion property and to give an expanded beads-molded article having reduced mechanical properties. It is preferred that the polylactic resin that constitutes at least the core layer be capped at is molecular chain ends as described previously, for reasons that the closed cell content of the expanded bead becomes high.

As used herein, the closed cell content of the expanded bead is measured as follows. The expanded beads are allowed to stand for aging in a constant temperature and humidity room at 23° C. under atmospheric pressure and a relative humidity of 50% for 10 days. In the same room, about 20 cm³ bulk volume of the expanded beads thus aged are sampled and measured for the precise apparent volume Va by a water immersion method. The sample whose apparent volume Va has been measured is fully dried and measured for its true volume Vx according to Procedure C of ASTM D-2856-70 using Air Comparison Pycnometer Type-930 manufactured by Toshiba Beckmann Inc. From the volumes Va and Vx, the closed cell content is calculated by the formula (4). The average (N=5) is the closed cell content of the expanded bead.

$$\text{Closed cell content (\%)} = (Vx - W/\rho) \times 100 / (Va - W/\rho) \quad (4)$$

wherein

Vx represents the true volume (cm³) of the expanded beads measured by the above method, which corresponds to a sum of a volume of the resin constituting the expanded beads and a total volume of all the closed cells in the expanded beads, Va represents an apparent volume (cm³) of the expanded beads, which is measured by a rise of the water level when the expanded beads are immersed in water contained in a measuring cylinder, W is a weight (g) of the sample expanded beads used for the measurement; and ρ is a density (g/cm³) of the resin constituting the expanded beads.

The expanded beads of the present invention give, upon being subjected to in-mold molding, a polylactic resin expanded beads-molded article whose shape is not specifically limited. Not only molded articles with a plate-like, columnar, vessel-like or block-like form but also articles with a complicated three-dimensional shape, in particular thick-walled articles may be produced.

These expanded beads-molded articles, which are produced from the specific expanded beads, show excellent fuse-bonding between the expanded beads. Further, through a heat treatment of the polylactic resin that constitutes the expanded beads, the expanded beads-molded article show excellent heat resistance, such as compressive strength and dimensional stability at high temperatures.

The expanded beads-molded article obtained as described above preferably has a bulk density of 15 to 300 g/L, more preferably 25 to 180 g/L, for reasons of lightness in weight and excellence in mechanical properties.

The expanded beads-molded article preferably has a closed cell content of 60% or more, more preferably 70% or more, still more preferably 80% or more. When the closed cell content is excessively low, there is a possibility that the mechanical properties such as compressive strength of the expanded beads-molded article is deteriorated.

The closed cell content of the expanded beads-molded article may be determined in the same manner as that for the measurement of the closed cell content of the expanded beads except that the measurement sample with a size of 25×25×30 mm is cut out from a center part of the expanded beads-molded article (skin should be completely cut off).

The expanded beads-molded article shows excellent fuse-bonding between the expanded beads. The fuse-bonding rate is preferably 50% or more, more preferably 60% or more, particularly preferably 80% or more. The expanded beads-molded article having a high fuse-bonding rate excels in mechanical properties, particularly in bending strength. The fuse-bonding rate is intended to refer to a percentage of the expanded beads which undergo material breakage when the molded article is ruptured, based on the expanded beads present on the ruptured surface. When the beads are not fuse-bonded to each other, they are separated from each other at their interface without involving any material breakage.

A method for preparing the polylactic resin expanded beads of the present invention will be next described. As the method for preparing the polylactic resin expanded beads of the present invention, there may be mentioned an extrusion foaming method, a gas impregnation pre-expansion method, a dispersing medium release foaming method and other methods that utilize the above methods or principles.

The extrusion foaming method is, for example, a method including melting and kneading a polylactic resin in an extruder, injecting a physical blowing agent into the extruder, kneading the resin and the blowing agent to obtain a foamable molten resin, extruding the foamable molten resin through a multi-hole die to obtain a foamed extrudate in the form of strands, and cutting the extrudate to obtain expanded beads. In this method, a resin particle preparation step, a blowing agent impregnation step and a foaming step may be performed using one extrusion device. As to such a method, reference may be made to, for example, Japanese Kokai Publication No. JP-A-2007-100025 and International Publication No. WO2008/123367. When the above method is adopted for producing the expanded beads of the present invention, a coextrusion foaming method may be suitably employed for preparing the expanded beads that meet the requirements with respect to their surface regions and center regions.

The gas impregnation pre-expansion method is, for example, a method including melting and kneading a polylactic resin in an extruder, extruding the kneaded resin in the form of strands, and cutting the extrudate to obtain resin particles, charging the resin particles in a pressure resistant closed vessel, injecting a physical blowing agent into the pressure resistant closed vessel to impregnate the resin particles with the blowing agent to obtain foamable resin particles, placing the foamable resin particles in a pre-expanding vessel, and heating the foamable resin particles with a heating medium such as steam, a hot gas or a mixture thereof to foam and expand the foamable resin particles to obtain expanded beads. In the formation of the resin particles, a suitable method such as a strand cutting method or an under-water cutting method may be adopted. In the step of injecting a physical blowing agent into the pressure resistant closed vessel to impregnate the resin particles with the blowing agent, a liquid phase impregnation method or a gas phase impregnation method may be suitably selectively used. In the gas impregnation pre-expansion method, a resin particle preparation step, a blowing agent impregnation step and a foaming step are carried out separately.

As to such a method, reference may be made to, for example, Japanese Kokai Publications No. JP-A-2000-136261 and No. JP-A-2006-282750. When the gas impregnation pre-expansion method is adopted for producing the expanded beads of the present invention, a coextrusion foaming method may be suitably employed for preparing resin particles each composed of an outer layer and a core layer, from which the expanded beads that meet the requirements with respect to their surface regions and center regions.

The dispersing medium release foaming method is, for example, a method including melting and kneading a polylactic resin in an extruder, extruding the kneaded resin in the form of strands, and cutting the extrudate to obtain resin particles, dispersing the resin particles in a dispersing medium contained in a pressure resistant closed vessel, impregnating a physical blowing agent into the resin particles, while heating them, to obtain foamable resin particles, and releasing the foamable resin particles together with the dispersing medium, at an adequate expanding temperature, from the closed vessel to obtain expanded beads. In this method, while a resin particle preparation step, a blowing agent impregnation step and a foaming step may be performed separately, the blowing agent impregnation step and the foaming step are generally carried out in a single stage. The method of producing polylactic resin expanded beads will next be described in detail mainly with regard to the dispersing medium release foaming method.

In the resin particle preparation step, resin particles may be prepared by extruding a base resin into which required additives have been incorporated, the extrudate being then pelletized, for example, a strand cutting method or an under-water cutting method. In view of the fact that the above formulas (1) and (2) should be met in the present invention, it is preferable to produce resin particles each composed of a core and an outer layer. Such resin particles each composed of a core and an outer layer may be produced using a coextrusion molding technique disclosed in, for example, Japanese Kokoku Publications Nos. JP-B-S41-16125, JP-B-S43-23858 and JP-B-S44-29522 and Japanese Kokai Publication No. JP-A-S60-185816.

The coextrusion method generally uses a device in which an extruder for forming a core layer and an extruder for forming an outer layer are connected to a coextrusion die. A polylactic resin and, if needed, additives are fed to the extruder for forming a core layer and melted and kneaded, while another polylactic resin and, if needed, additives are fed to the extruder for forming an outer layer. The respective molten kneaded masses thus obtained are combined in the die and extruded in the form of strands through small holes of a mouthpiece attached to a die exit at a tip of the extruder. Each of the strands has a multi-layer structure having a columnar core layer and an annular outer layer covering the core layer. The extruded strands are cooled by, for example, being immersed in water and then cut with a pelletizer such that the resin particles obtained each have a specific weight, whereby resin particles having a multi-layer structure are obtained. Alternatively, such resin particles may be obtained by cutting the extruded strands having a multi-layer structure into resin particles each have a specific weight, the resin particles being cooled after or simultaneous with the cutting.

The resin particles preferably have an average weight per one particle of 0.05 to 10 mg, more preferably 0.1 to 4 mg. When the average weight is excessively small, a special production method should be adopted. When the average weight is excessively large, on the other hand, there is a possibility that the expanded beads obtained therefrom have a broad density distribution and cannot be filled in a mold cavity in an efficient manner at the time of molding. The shape of the resin particles may be, for example, a cylindrical column, a sphere, a rectangular column, an oval or a cylinder. Expanded beads obtained by foaming and expanding the resin particles have a shape that is similar to that of the resin particles before expansion.

When the resin particles are produced by melting and kneading the base resin with an extruder, followed by extrusion into strands, it is preferable to dry the polylactic resin, which is a constituent of the base resin, before kneading for reasons of prevention of degradation of the polylactic resin by hydrolysis. In order to suppress degradation of the polylactic resin by hydrolysis, a method using an extruder provided with a vent hole may also be adopted so that moisture is removed from the polylactic resin by evacuation through the vent hole. The removal of moisture from the polylactic resin may permit the prevention of the generation of air bubbles in the resin particles and may improve the stability of the extrusion procedures.

Description will be next made of the blowing agent impregnation step and expansion step of the dispersing medium release foaming method. In one embodiment of the dispersing medium release foaming method, the resin particles are impregnated with a physical blowing agent to form expandable resin particles, for example, by heating, in a pressure resistant vessel, the expanded beads dispersed in a dispersing medium together with a physical blowing agent, or by first dispersing and heating the resin particles in a dispersing medium in a pressure resistant vessel, a blowing agent being subsequently blown into the pressure resistant vessel. The obtained foamable resin particles are then released together with the dispersing medium into a zone having a pressure lower than that in the pressure resistant vessel so that the foamable resin particles are allowed to foam and expand to obtain the expanded beads.

A foaming aid may be previously incorporated into the resin particles. Examples of the foaming aid include an inorganic powder such as talc, calcium carbonate, borax, zinc borate, aluminum hydroxide and silica, and a polymer such as polytetrafluoroethylene, polyethylene wax, polycarbonate, polyethylene terephthalate, polypropylene terephthalate, polybutylene terephthalate, polycylohexanedimethylene terephthalate, polyethylene naphthalate, polybutyelenenaphthalate, silicone, methyl methacrylate copolymer and crosslinked polystyrene. Among the above foaming aids, polytetrafluoroethylene, polyethylene wax and crosslinked polystyrene are preferred for the purpose of the present invention. Particularly preferred is hydrophobic polytetrafluoroethylene powder.

In corporation of the foaming aid into the base resin, the foaming aid may be kneaded as such together with the base resin. For reasons improved dispersibility, however, it is preferred that the foaming aid be formed into a master batch and the master batch be kneaded with the base resin.

Since the apparent density and cell diameter of the expanded beads according to the present invention vary depending upon the blending amount of the foaming aid, it is expected that the foaming aid has an effect of controlling the properties. The amount of the foaming aid is generally 0.001 to 5 parts by weigh, preferably 0.005 to 3 parts by weight, more preferably 0.01 to 2 parts by weight, per 100 parts by weight of the base resin.

Because a polylactic resin is easily hydrolyzed, an additive to be blended with the base resin is desired to be selected from hydrophobic substances while avoiding the use of a hydrophilic substance as much as possible. Thus, when a hydrophobic foaming aid is used, it is possible to obtain an effect as a foaming aid while preventing degradation of the polylactic resin due to hydrolysis. In particular, it is possible to reduce the apparent density (improvement of expansion ratio) and to uniformize the cell diameter while sufficiently preventing hydrolysis of the polylactic resin.

As described above, in one embodiment of the dispersing medium release foaming method, resin particles are dispersed in a dispersing medium, such as, water in a pressure resistant closed vessel, such as an autoclave, to which a blowing agent is fed under a pressure in a predetermined amount. The dispersion is then stirred at an elevated temperature for a predetermined time to impregnate the blowing agent into the polylactic resin particles. The contents in the vessel are discharged utilizing the pressure inside the vessel into a lower pressure zone to foam and expand the resin particles and to obtain the expanded beads. At the time of the discharge, it is preferred that the contents are released while applying a back pressure to a space in the vessel. When particularly low apparent density (high expansion ratio) expanded beads are to be produced, the following treatment is carried out. Thus, after the expanded beads obtained by the above method have been subjected to an aging step under atmospheric pressure, as is customarily done, they are charged in a pressure resistant closed vessel again and is subjected to a pressurizing treatment using a pressurized gas such as air at 0.01 to 0.10 MPa(G) so that the inner pressure in the expanded beads is increased. The resulting expanded beads are heated with a heating medium such as hot air, steam or a mixture of air and steam in an expansion vessel thereby to obtain expanded beads having a further lower apparent density (the foregoing procedure will be hereinafter referred to as "two stage expansion").

For reasons that expanded beads having a lower apparent density are obtainable as compared with the extrusion foaming method and, additionally, expanded beads having excellent in-mold formability and physical properties are obtainable, the above gas impregnation pre-expansion method and dispersing medium release foaming method are preferred expanded beads preparation methods. Especially preferred is the dispersing medium release foaming method.

As the dispersing medium for dispersing the resin particles, not only water but also other media may be used as long as the resin particles are not dissolved therein. Examples of such a dispersing medium include ethylene glycol, glycerin, methanol and ethanol. Water is preferred, however.

A dispersing agent may be added to the dispersing medium, if necessary, in dispersing the resin particles in the dispersing medium. Examples of the dispersing agent include inorganic substances such as aluminum oxide, tribasic calcium phosphate, magnesium pyrophosphate, titanium oxide, zinc oxide, basic magnesium carbonate, basic zinc carbonate, calcium carbonate, kaolin, mica and clay; and water soluble polymer protective colloid agents such as polyvinylpyrrolidone, polyvinyl alcohol and methyl cellulose. The dispersing medium may also be incorporated with a dispersing aid such as an anionic surfactant, e.g. sodium dodecylbenzenesulonate and sodium alkanesulfonate.

The dispersing agent may be used in an amount of 0.05 to 3 parts by weight per 100 parts by weight of the resin particles, while the dispersing aid may be used in an amount of 0.001 to 0.3 part by weight per 100 parts by weight of the resin particles.

As the blowing agent, there may be used, for example, physical blowing agents including organic physical blowing agents such as hydrocarbons (e.g. butane, pentane and hexane), and halogenated hydrocarbons (e.g. trichlorofluoromethane, dichlorofluoromethane, tetrachlorofluoroethane and dichloromethane) and inorganic physical blowing agents such as inorganic gas (e.g. carbon dioxide, nitrogen and air) and water. These physical blowing agents may be used singly or in combination of two or more thereof. Among physical blowing agents, those which are composed mainly of an inorganic physical blowing agent such as carbon dioxide, nitrogen and air are preferably used. Carbon dioxide is particularly preferred. The term "physical blowing agent composed mainly of an inorganic physical blowing agent" as used herein is intended to refer to a physical blowing agent which contains at least 50% by mole, preferably at least 70% by mole, still more preferably at least 80% by mole, of an inorganic physical blowing agent.

The amount of the physical blowing agent is suitably determined in consideration of the kind of the blowing agent, amount of the additives, the apparent density of the desired expanded beads, etc. For example, the inorganic physical blowing agent is used in an amount of about 0.1 to 30 parts by weight, preferably 0.5 to 15 parts by weight, more preferably 1 to 10 parts by weight, per 100 parts by weight of the based resin.

Description will next be made of a method for producing an expanded beads-molded article from the expanded beads of the present invention. For the preparation of an expanded beads-molded article, any known in-mold molding method may be adopted. Examples of such a method include a compression molding method, a cracking molding method, a pressure molding method, a compression filling molding method and an ambient pressure filling molding method, in each of which a conventional mold for expanded beads is used (see, for example, Japanese Kokoku Publications No. JP-B-S46-38359, No. JP-B-S51-22951, No. JP-B-H04-46217, No. JP-B-H06-22919 and No. JP-B-H06-49795).

As the generally preferably adopted in-mold molding method, there may be mentioned a batch-type in-mold molding method and a hereinafter described continuous in-mold molding method. In the batch-type method, expanded beads are filled in a mold cavity of a conventional mold for thermoplastic resin expanded beads adapted to be heated and cooled and to be opened and closed. Steam having a saturation vapor pressure of 0.01 to 0.25 MPa(G), preferably 0.01 to 0.20 MPa(G), is then fed to the mold cavity to heat, foam and fuse-bond the beads together. The obtained expanded beads-molded article is then cooled and taken out of the mold cavity.

The feed of the steam may be carried out by a conventional method such as a combination of one-direction flow heating, reversed one-direction flow heating and substantial heating. The particularly preferred heating method includes preheating, one-direction flow heating, reversed one-direction flow heating and substantial heating which are successively performed in this order.

The expanded beads-molded article may be also produced by a continuous in-mold molding method in which the expanded beads are fed to a mold space which is defined between a pair of vertically spaced, continuously running belts disposed in a path. During the passage through a steam-heating zone, saturated steam with a saturation vapor pressure of 0.01 to 0.25 MPa(G) is fed to the mold space so that the expanded beads are foamed and fuse-bonded together. The resulting molded article is cooled during its passage through a cooling zone, discharged from the path and successively cut into a desired length (see, for example, Japanese Kokai Publications No. JP-A-H09-104026, No. JP-A-H09-104027 and No. JP-A-H10-180888).

Prior to the above in-mold molding, the expanded beads obtained by the above-described method may be charged in a pressure resistant closed vessel and treated with a pressurized gas such as air to increase the pressure inside the cells thereof to 0.01 to 0.15 MPa(G). The treated beads, whose in-mold moldability has been further improved, are taken out of the closed vessel and then subjected to in-mold molding. The treated expanded beads exhibit further improved in-mold moldability.

EXAMPLES

The following examples will further illustrate the present invention.

Examples 1 to 4, Examples 6 to 9 and Comparative Examples 2 and 3

An extrusion device having an extruder (inside diameter: 65 mm) for forming a core layer, an extruder (inside diameter: 30 mm) for forming an outer layer and a coextrusion die for forming multi-layered strands which was attached to exits of the two extruders was used. The polylactic resins shown in Table 1 for forming a core layer and an outer layer were fed to respective extruders in the amounts shown in Table 1 and melted and kneaded. The molten kneaded masses were introduced into the coextrusion die and combined in the die and extruded in the form of strands through small holes of a mouthpiece attached to a die exit. Each of the strands had a multi-layer structure having a core layer and an annular outer layer covering the core layer. The extruded strands were cooled with water and then cut with a pelletizer into particles each having a weight about 2 mg. Drying of the cut particles gave multi-layered resin particles.

Meanwhile, the polylactic resin for forming the core layer was blended with a master batch of polytetrafluoroethylene powder (Trade name: TFW-1000, manufactured by Seishin Enterprise Co., Ld.) as a cell controlling agent so that the content of the polytetrafluoroethylene powder in the resin was 1,000 ppm by weight. Also, the polylactic resin for forming the outer layer was blended with a master batch of a phthalocyanine green pigment so that the content of the pigment in the resin was 100 ppm by weight.

Using the obtained resin particles, polylactic resin expanded beads were prepared. Thus, 1 kg of the obtained resin particles were charged in a 5 L closed vessel together with 3 L of water as a dispersing medium, to which 0.1 part by weight of an aluminum oxide as a dispersing agent and 0.01 part by weight (effective amount) of a surfactant (sodium alkylbenzenesulfonate, Trade name: Neogen S-20F, manufactured by Dai-ichi Kogyou Seiyaku Co., Ltd.) were added. The contents were then heated with stirring. When a temperature lower by 5° C. than the foaming temperature shown in Table 1 was reached, carbon dioxide as a blowing agent was injected into the closed vessel until a pressure lower by 0.2 MPa(G) than the pressure shown in Table 1 was reached. After having been allowed to stand at that temperature for 15 minutes, the contents in the vessel were heated to the foaming temperature and carbon dioxide was injected until the pressure shown in Table 1 was reached. After having been maintained at the foaming temperature for 15 minutes, the contents were released to atmospheric pressure while applying back pressure with carbon dioxide to obtain polylactic resin expanded beads having an apparent density as shown in Table 1. Incidentally, the amount (part by weight) of the dispersing agent and surfactant is per 100 parts by weight of the polylactic resin particles.

The conditions (inside pressure of the closed vessel and foaming temperature) under which the polylactic resin expanded beads were prepared are shown in Table 1. Various physical properties of the obtained expanded beads are also shown in Table 1.

Example 5

The resin particles obtained in Example 1 were subjected to a pressurization treatment using air so that inner pressure of 0.18 MPa(G) was imparted thereto. The treated particles were then heated with a mixed heating medium composed of steam and compressed air to conduct a two stage expansion at expansion environment temperature of 58° C., thereby obtaining the expanded beads shown in Table 1.

Example 10

Using the multi-layered resin particles obtained in Example 1, polylactic resin expanded beads were prepared as follows. Thus, 1 kg of the multi-layered resin particles were charged in a 5 L closed vessel provided with a stirrer together with 3 L of water as a dispersing medium, to which 0.004 part by weight (effective amount) of a surfactant (sodium alkylbenzenesulfonate, Trade name: Neogen S-20F, manufactured by Dai-ichi Kogyou Seiyaku Co., Ltd.) were added. The amount (part by weight) of the surfactant is per 100 parts by weight of the polylactic resin particles. After the temperature of the contents was adjusted to 30° C. with stirring, carbon dioxide as a blowing agent was injected into the closed vessel until a pressure lower of 2.0 MPa(G) was reached as shown in Table 1. The contents were then maintained as such for 3 hours to impregnate carbon dioxide into the resin particles.

Thereafter, the pressure inside the closed vessel was reduced to the atmospheric pressure. The resin particles were taken out and subjected to centrifugation for the removal of adhered water. Further, surface moisture on the resin particles was removed with air. The resin particles were measured for the amount of impregnated carbon dioxide 10 minutes after they had been taken out of the closed vessel. The amount was found to be 5.8 parts by weight.

The blowing agent-impregnated resin particles were then allowed to quiescently stand in an environment maintained at a temperature of 23° C. under a relative humidity of 50% for 2.5 hours so that part of the impregnated carbon dioxide was liberated therefrom. The amount of impregnated blowing agent was measured 10 minutes after the blowing agent liberation treatment had been completed and found to be 3.7 parts by weight.

The thus obtained expandable resin particles were placed in a closed vessel provided with a pressure adjusting valve, into which a mixed heating medium that contained steam and compressed air and was adjusted to 95° C. was fed for 8 seconds. As a result, the particles were foamed and expanded at an environment temperature of 81° C. to obtain polylactic resin expanded beads having an apparent density as shown in Table 1.

Various physical properties of the obtained expanded beads are also shown in Table 1.

Comparative Example 1

Polylactic resin expanded beads were obtained in the same manner as that in Example 1 except that an extruding device having a strand-forming die attached to an exit side of an extruder (inside diameter: 65 mm) for forming a core layer was used for producing single layer polylactic resin particles The conditions (inside pressure of the closed vessel and foaming temperature) under which the polylactic resin expanded beads were prepared are shown in Table 1. Various physical properties of the obtained expanded beads are also shown in Table 1.

TABLE 1

| | | | Ex. 1 | Ex. 2 | Ex. 3 | Ex. 4 | Ex. 5 | Ex. 6 |
|---|---|---|---|---|---|---|---|---|
| Resin Particles | Core layer | Composition | *1) | *1) | *1) | *1) | *1) | *1)/*2) = 60/40 |
| | | Softening point A (° C.) | 157 | 157 | 157 | 157 | 157 | 145 |
| | Outer layer | Composition | *2) | *1)/*2) = 20/80 | *1)/*2) = 40/60 | *1)/*2) = 20/80 | *2) | *2) |
| | | Softening point B (° C.) | 58 | 125 | 135 | 125 | 58 | 58 |
| | | [(A) − (B)] (° C.) | 99 | 32 | 22 | 32 | 99 | 87 |
| | | Core layer/Outer layer (weight ratio) | 90/10 | 90/10 | 90/10 | 95/5 | 90/10 | 90/10 |
| Expanded Beads | | Closed vessel inside pressure (MPa(G)) | 3.0 | 3.0 | 3.0 | 3.0 | 3.0 | 2.0 |
| | | Foaming temperature (° C.) | 145.0 | 145.0 | 144.0 | 145.0 | 145.0 | 145.5 |
| | | Apparent density (g/L) | 81.0 | 82.6 | 75.5 | 80.0 | 41.1 | 118.2 |
| | | Endothermic calorific value of whole bead Br:endo (J/g) | 38 | 38 | 37 | 39 | — | 26 |
| | | Endothermic calorific value of center region of bead Brc:endo (J/g) | 42 | 42 | 42 | 42 | — | 27 |
| | | Endothermic calorific value of surface region of bead Brs:endo (J/g) | 32 | 34 | 33 | 33 | — | 20 |
| | | Exothermic calorific value of center region bead Bfc:exo (J/g) | 21 | 19 | 14 | 18 | — | 12 |

Note: for Ex. 5, the entry "Two stage expanded bead" spans across the composition/softening/ratio rows; Apparent density = 41.1; Endothermic whole bead = 39; center = 42; surface = 30; exothermic center = 15.

TABLE 1-continued

|  |  | | | | | | | |
|---|---|---|---|---|---|---|---|---|
| Endothermic calorific value of center region of bead Bfc:endo (J/g) | 40 | 40 | 42 | 39 | — | 37 | 27 |
| Bfc:endo − Bfc:exo (J/g) | 19 | 21 | 28 | 21 | — | 22 | 15 |
| Closed cell content (%) | 93 | 94 | 93 | 94 | — | 94 | 92 |
| Average cell diameter (μm) | 135 | 140 | 78 | 121 | — | 187 | 122 |

| | | | Ex. 7 | Ex. 8 | Ex. 9 | Ex. 10 | Comp. Ex. 1 | Comp. Ex. 2 | Comp. Ex. 3 |
|---|---|---|---|---|---|---|---|---|---|
| Resin Particles | Core layer | Composition | *1)/*2) = 80/20 | *1) | *1)/*2) = 60/40 | *3)/*4) = 60/40 | *1) | *1)/*2) = 50/50 | *1)/*2) = 50/50 |
| | | Softening point A (° C.) | 153 | 157 | 145 | 145 | 157 | 140 | 140 |
| | Outer layer | Composition | *2) | *2) | *2) | *2) | — | *2) | *1) |
| | | Softening point B (° C.) | 58 | 58 | 58 | 58 | — | 58 | 157 |
| | | [(A) − (B)] (° C.) | 95 | 99 | 87 | 87 | — | 82 | −17 |
| | | Core layer/Outer layer (weight ratio) | 90/10 | 80/20 | 90/10 | 95/5 | single layer | 90/10 | 90/10 |
| Expanded Beads | | Closed vessel inside pressure (MPa(G)) | 2.0 | 3.0 | 3.0 | 2.0 | 3.0 | 3.0 | 3.0 |
| | | Foaming temperature (° C.) | 145.0 | 145.0 | 145.0 | — | 145.0 | 145.0 | 145.0 |
| | | Apparent density (g/L) | 112.1 | 81.0 | 96.2 | 109.6 | 87.7 | 100.3 | 106.0 |
| | | Endothermic calorific value of whole bead Br:endo (J/g) | 30 | 37 | 26 | 26 | 42 | 24 | 26 |
| | | Endothermic calorific value of center region of bead Brc:endo (J/g) | 32 | 42 | 27 | 26 | 42 | 26 | 26 |
| | | Endothermic calorific value of surface region of bead Brs:endo (J/g) | 23 | 30 | 20 | 22 | 42 | 21 | 30 |
| | | Exothermic calorific value of center region bead Bfc:exo (J/g) | 15 | 20 | 17 | 12 | 13 | 11 | 14 |
| | | Endothermic calorific value of center region of bead Bfc:endo (J/g) | 31 | 40 | 27 | 27 | 41 | 26 | 26 |
| | | Bfc:endo − Bfc:exo (J/g) | 16 | 21 | 9 | 14 | 28 | 15 | 12 |
| | | Closed cell content (%) | 92 | 93 | 92 | 94 | 93 | 92 | 92 |
| | | Average cell diameter (μm) | 135 | 130 | 142 | 27 | 142 | 147 | 140 |

*1) Crystalline PLA: TERRAMAC TP-4000E, manufactured by Unitika Ltd. (modified with a carbodiimide compound, melting point: 168° C., MFR (190° C./2.16 kgf): 4.6 g/10 min)
*2) Non-crystalline PLA: TERRAMAC TP-4001E, manufactured by Unitika Ltd. (modified with a carbodiimide compound, melting point: not determined, MFR (190° C./2.16 kgf): 6.0 g/10 min)
*3) Crystalline PLA: TERRAMAC TE-4000E, manufactured by Unitika Ltd. (modified with a carbodiimide compound, melting point: 168° C., MFR (190° C./2.16 kgf): 12.6 g/10 min)
*4) Non-crystalline PLA: TERRAMAC TE-4001E, manufactured by Unitika Ltd. (modified with a carbodiimide compound, melting point: not determined, MFR (190° C./2.16 kgf): 8.7 g/10 min)

Apparent Density:

Apparent density was measured by the method described above.

Closed Cell Content:

Closed cell content was measured by the method described above.

Average Cell Diameter:

Average cell diameter was measured by the method described above.

Using the obtained expanded beads, expanded beads-molded articles were prepared. In a molding device for forming a flat plate having a length of 200 mm, a width of 250 mm and a thickness of 20 mm (in Examples 1-2, 2-2 and 5-2, the thickness was 50 mm), the expanded bead products obtained in the above Examples and Comparative Examples were each placed and subjected to an in-mold molding process by a pressurized molding technique while heating with steam to obtain expanded beads-molded articles each in the form of a plate. The heating was performed as follows. Steam was fed for 5 seconds for preheating in such a state that drain valves on both sides of the molds were maintained in an open state (purging step). Next, while maintaining the drain valve on the stationary mold side in an open state, steam was fed from the movable mold side for 5 seconds. Then, while maintaining the drain valve on the movable mold side in an open state, steam was fed from the stationary mold side for 10 seconds. Thereafter, molding was carried out by heating at the steam pressure (vapor pressure) shown in Tables 2 and 3.

After completion of the heating, the pressure was released and cooling with water was carried out until the surface pressure attributed to the inner pressure of the molded body was reduced to 0.02 MPa(G). The molds were then opened and the molded body was taken out therefrom. The molded body was aged in an oven at 40° C. for 15 hours, then aged in an oven at 70° C. for 15 hours, and thereafter allowed to gradually cool to room temperature to obtain an expanded beads-molded article.

Each of the thus prepared expanded beads-molded articles were evaluated for their various physical properties. The results of the 20 mm thick molded articles and 50 mm thick molded articles are summarized in Tables 2 and 3, respectively.

TABLE 2

| | | Example | | | | | | | | | | Comparative Example | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| Expanded beads-molded article | Bead inner pressure (MPa(G)) | 0.05 | 0.05 | 0.05 | 0.05 | 0.12 | 0.05 | 0.05 | 0.05 | 0.05 | 0.05 | 0.05 | 0.05 | 0.05 |
| | Vapor pressure (MPa(G)) | 0.06 | 0.18 | 0.22 | 0.16 | 0.05 | 0.06 | 0.06 | 0.06 | 0.06 | 0.12 | 0.30 | 0.06 | 0.12 |
| | Bulk density of molded article (g/L) | 60.3 | 68.5 | 52.7 | 65.3 | 30.4 | 90.0 | 84.2 | 60.7 | 68.1 | 77.3 | 61.5 | 69.6 | 74.3 |
| | Shrinkage (%) | 1.2 | 1.4 | 1.2 | 1.6 | 1.6 | 1.8 | 1.6 | 1.2 | 2.2 | 1.4 | 5< | 1.6 | 1.6 |
| | Fuse-bonding (%) | 90 | 80 | 60 | 80 | 80 | 90 | 90 | 90 | 90 | 90 | 10 | 80 | 10 |

TABLE 2-continued

|  |  | Example | | | | | | | | | | Comparative Example | | |
|---|---|---|---|---|---|---|---|---|---|---|---|---|---|---|
|  |  | 1 | 2 | 3 | 4 | 5 | 6 | 7 | 8 | 9 | 10 | 1 | 2 | 3 |
| Appearance | | good | good | good | good | good | good | good | good | good | good | bad | good | good |
| Heat resistance dimension change upon heating at 120° C. (%) | | 0.3 | −0.2 | −0.2 | −0.2 | −1.6 | −1.4 | −0.9 | −0.1 | −1.6 | −1.7 | *5) | −2.1 | *5) |

*5): Due to poor fuse-bonding between beads, test piece was not able to be obtained.

TABLE 3

|  |  | Example | | |
|---|---|---|---|---|
|  |  | 1-2 | 2-2 | 5-2 |
| Expanded beads-molded article | Bead inner pressure (MPa(G)) | 0.05 | 0.05 | 0.12 |
|  | Vapor pressure (MPa(G)) | 0.08 | 0.20 | 0.06 |
|  | Bulk density of molded article (g/L) | 57.5 | 64.6 | 27.9 |
|  | Shrinkage (%) | 0.8 | 1.6 | 1.2 |
|  | Fuse-bonding (%) | 90 | 60 | 90 |
|  | Appearance | good | good | good |
|  | Heat resistance dimension change upon heating at 120° C. (%) | 0.2 | −0.2 | −1.6 |

Appearance:

Appearance was evaluated by observation of the surface of an expanded beads-molded body and rated as follows:
Good: No conspicuous spaces between beads due to insufficient secondary expansion are observed on the surface.
Bad: Such spaces are significantly observed.

Fuse-Bonding:

Fuse-bonding is evaluated in terms of a proportion (fuse-bonding percentage) of the number of expanded beads that have undergone material breakage based on the number of expanded beads that are exposed on a ruptured cross section. More specifically, a cut with a depth of 10 mm was formed on the expanded beads-molded article with a cutter knife. The article was then ruptured along the cut line. The ruptured cross section was observed to count a number (n) of the expanded beads present on the surface and a number (b) of the expanded beads which underwent material breakage. The percentage of (b) based on (n) represents the fuse bonding (%). The results are shown in Tables 2 and 3.

Bulk Density of Molded Article:

The bulk density of the expanded beads-molded article was measured as follows. The expanded beads-molded article was allowed to stand at a temperature of 23° C. under a relative humidity of 50% for 24 hours and measured for its outer dimension to determine the bulk volume thereof. The expanded beads-molded article was then weighed precisely. The weight of the expanded beads-molded article was divided by the bulk volume and the unit was converted to determine the bulk density (g/L) thereof.

Bead Inner Pressure:

The inner pressure of the expanded beads that were used for the preparation of the expanded beads-molded article or subjected to the two stage expansion was determined using a part of the expanded beads (hereinafter referred to as a group of expanded beads) just before feeding to the in-mold molding device or just before feeding to the two stage expansion device as follows:

A group of expanded beads whose inside pressure had been increased and which were just before feeding to the in-mold molding device or a group of expanded beads which were just before feeding to the two stage expansion device were packed, within 60 seconds after they were taken out of the pressurized tank, in a bag which had a size of 70 mm×100 mm and which was provided with a multiplicity of pin holes each having a size preventing the passage of the beads but allowing free passage of air. The beads-containing bag was transferred to a constant temperature and humidity room maintained at 23° C. and 50% relative humidity under ambient pressure. The beads-containing bag was placed on a weighing device in the room and weighed. The weight measurement was carried out 120 seconds after the expanded beads had been taken out of the pressure tank. The measured weight was Q (g). The beads-containing bag was then allowed to stand for 10 days in the same room. The pressurized air in the expanded beads gradually permeated through the cell walls and escaped from the beads. Therefore, the weight of the beads decreased with the lapse of time. However, an equilibrium had been established and the weight had been stabilized after lapse of the 10 days period. Thus, the weight of the bag containing the expanded beads U (g) was measured again in the same room after the lapse of the 10 days period to give a value of U (g). The difference between Q (g) and U (g) was an amount of air increased, from which the inner pressure P (MPa) of the expanded beads was calculated according to the formula (5) shown below. The inner pressure P represents a gauge pressure.

$$P = (W/M) \times R \times T/V \quad (5)$$

In the above formula, M is the molecular weight of air (here, a constant of 28.8 (g/mol) is used), R is the gas constant (here a constant of 0.0083 (MPa·L(K·mol) is used), T represents an absolute temperature (and is 296K because 23° C. is used), and V represents a volume (L) obtained by subtracting the volume of the base resin of the group of the beads from the apparent volume of the group of the expanded beads.

The apparent volume of the group of the expanded beads is measured by immersing the entire expanded beads, which have been taken out of the bag after the lapse of the 10 days period, in 100 cm$^3$ of water at 23° C. contained in a measuring cylinder in the same room. From the rise of the water level, the volume Y (cm$^3$) is determined. This volume is converted to a volume in terms of (L). The volume (L) of the base resin in the group of the expanded beads is obtained by dividing the weight of the group of the expanded beads (the difference between U (g) and the weight Z (g) of the bag having a multiplicity of pin holes) by the density (g/cm$^3$) of the resin obtained by defoaming the expanded beads using a heat press, followed by unit conversion. The apparent density (g/cm$^3$) of the group of the expanded beads may be calculated by dividing the weight of the group of the expanded beads (g) (difference between U (g) and Z (g)) by the volume Y (cm$^3$).

In the above measurement, a plural numbers of the expanded beads are used so that the weight of the group of the expanded beads (difference between U (g) and Z (g)) is within the range of 0.5000 to 10.0000 g and the volume Y is within the range of 50 to 90 cm³.

Heat Resistance:

The expanded beads-molded articles were each evaluated for their heat resistance. In accordance with JIS K6767 (1976), "Dimensional Stability at High Temperatures", method B, a test piece was heated in a gear oven at 120° C. for 22 hours. Thereafter, the test piece was allowed to stand in a constant temperature and humidity room maintained at 23° C. and 50% relative humidity. From the dimensions before and after the heating, a change in dimension is calculated according to the following formula (6):

$$\text{Dimension change upon heating (\%)} = (([\text{Dimension after heating}] - [\text{Dimension before heating}])/[\text{Dimension before heating}]) \times 100 \quad (6)$$

EXPLANATION OF REFERENCE NUMERALS

1: Core layer
2: Outer layer
3: Surface region of expanded bead
4: Center region of expanded bead

The invention claimed is:

1. An expanded bead of a base resin including a polylactic acid resin, comprising:
   an exterior surface,
   a surface region including an entirety of the exterior surface and having a weight of one-sixth to one-fourth the weight of the expanded bead, and
   a center region located inside the surface region and having a weight of one-fifth to one-third the weight of the expanded bead,
   wherein the center region comprises a polylactic acid resin and the surface region comprises another different polylactic acid resin;
   wherein said expanded bead, said surface region and said center region show endothermic calorific values of (Br:endo) J/g, (Brs:endo) J/g and (Brc:endo) J/g, respectively, when specimens of said expanded bead, said surface region and said center region are each measured, after having been subjected to a pretreatment, by heat flux differential scanning calorimetry at a heating speed of 2° C./min in accordance with JIS K7122 (1987), said pretreatment including maintaining the specimen at a temperature higher than 30° C. than a melt completion temperature thereof for 10 minutes, then cooling the molten specimen to 110° C. at a cooling speed of 2° C./min, then maintaining the cooled specimen at 110° C. for 120 min, and then cooling the resulting specimen to 40° C. at a cooling speed of 2° C./min, and
   wherein (Br:endo), (Brs:endo) and (Brc:endo) meet the following equations (1) and (2):

$$(\text{Br:endo}) > 25 \quad (1)$$

$$(\text{Brc:endo}) > (\text{Brs:endo}) \geq 0 \quad (2).$$

2. The expanded bead according to claim 1, wherein the center region before being subjected to the pretreatment shows an endothermic calorific value (Bfc:endo) [J/g] and an exothermic calorific value (Bfc:exo) when measured by heat flux differential scanning calorimetry at a heating speed of 2° C./min in accordance with JIS K7122 (1987), wherein (Bfc:endo) and (Bfc:exo) meet the following equation (3):

$$40 > [(\text{Bfc:endo}) - (\text{Bfc:exo})] > 10 \quad (3).$$

3. The expanded bead according to claim 1, wherein the expanded bead has an apparent density of 25 to 400 g/L.

4. The expanded bead according to claim 1, wherein the expanded bead has an average cell diameter of 30 to 500 μm.

5. The expanded bead according to claim 1, wherein the expanded bead has a core layer comprising a polylactic resin having a softening point (A) [° C.], and an outer layer positioned on a surface side of the core layer and comprising a polylactic resin having a softening point (B) [° C.], wherein a difference [(A)−(B)] is greater than 0° C. and is not greater than 105° C.

6. A molded article comprising a multiplicity of the expanded beads according to claim 1 which are integrally fuse-bonded together, said molded article having a bulk density of 15 to 300 g/L.

7. A molded article comprising a multiplicity of the expanded beads according to claim 2 which are integrally fuse-bonded together, said molded article having a bulk density of 15 to 300 g/L.

* * * * *